(12) United States Patent
Penilla et al.

(10) Patent No.: US 12,707,238 B2
(45) **Date of Patent: *Aug. 11, 2026**

(54) METHODS AND SYSTEMS FOR VEHICLE DISPLAY DATA INTEGRATION WITH MOBILE DEVICE DATA

(71) Applicant: Emerging Automotive, LLC, Scotts Valley, CA (US)

(72) Inventors: Angel A. Penilla, Sacramento, CA (US); Albert S. Penilla, Scotts Valley, CA (US)

(73) Assignee: Emerging Automotive, LLC, Scotts Valley, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 18/427,686

(22) Filed: Jan. 30, 2024

(65) Prior Publication Data

US 2024/0171948 A1 May 23, 2024

Related U.S. Application Data

(63) Continuation of application No. 17/088,349, filed on Nov. 3, 2020, now Pat. No. 11,889,394, which is a (Continued)

(51) Int. Cl.
*H04W 4/44* (2018.01)
*B60L 50/60* (2019.01)

(Continued)

(52) U.S. Cl.
CPC ............... *H04W 4/44* (2018.02); *B60L 50/64* (2019.02); *B60L 50/66* (2019.02); *B60L 53/80* (2019.02);

(Continued)

(58) Field of Classification Search
CPC ....... H04W 4/44; H04W 4/029; H04W 12/08; H04W 4/80; H04W 84/12; B60L 50/64;

(Continued)

(56) References Cited

U.S. PATENT DOCUMENTS 9,648,107 B1 * 5/2017 Penilla ................ G06F 3/04886
10,405,152 B1 * 9/2019 Prabhudeva .......... H04L 67/306

(Continued)

*Primary Examiner* — Frederick M Brushaber

(57) ABSTRACT

Methods and systems are provided. One example method includes providing a connection to the Internet for a vehicle via wireless connection circuitry associated with an on-board computer of the vehicle. The connection is used to communicate with a service, and a user account is assigned to a user and the user account is associated with settings of the user. The method includes providing communication, by the on-board computer, with a mobile device. The communication provides for pairing the mobile device with the on-board computer using credentials associated with the user account of the user. The method includes accessing, using the on-board computer, data from a mobile device application of the mobile device for rendering content to a display screen of the vehicle. At least some data accessed from the mobile device application is used to render said content to the display screen of the vehicle. The content of the mobile device application rendered on the display screen of the vehicle is in addition to content rendered on the display screen of the vehicle for a native application of the vehicle.

20 Claims, 27 Drawing Sheets

Related U.S. Application Data continuation of application No. 16/411,109, filed on May 13, 2019, now Pat. No. 10,824,330, which is a continuation of application No. 15/243,933, filed on Aug. 22, 2016, now Pat. No. 10,286,798, which is a continuation of application No. 14/640,004, filed on Mar. 5, 2015, now Pat. No. 9,423,937, which is a continuation-in-part of application No. 13/842,158, filed on Mar. 15, 2013, now Pat. No. 9,229,905, and a continuation of application No. 13/784,823, filed on Mar. 5, 2013, now Pat. No. 9,285,944, and a continuation-in-part of application No. 13/452,882, filed on Apr. 22, 2012, now Pat. No. 9,123,035.

(60) Provisional application No. 61/745,729, filed on Dec. 24, 2012, provisional application No. 61/478,436, filed on Apr. 22, 2011.

(51) Int. Cl.

| | |
|---|---|
| ***B60L 50/64*** | (2019.01) |
| ***B60L 53/80*** | (2019.01) |
| ***B60L 58/12*** | (2019.01) |
| ***G06F 3/048*** | (2013.01) |
| ***G06F 3/04817*** | (2022.01) |
| ***G06F 3/0482*** | (2013.01) |
| ***G06F 3/0484*** | (2022.01) |
| ***G06F 3/04842*** | (2022.01) |
| ***G06F 3/04845*** | (2022.01) |
| ***G06F 3/0488*** | (2022.01) |
| ***G06F 3/04883*** | (2022.01) |
| ***G06F 3/14*** | (2006.01) |
| ***G06F 3/16*** | (2006.01) |
| ***G06F 9/451*** | (2018.01) |
| ***G06Q 20/18*** | (2012.01) |
| ***G06Q 30/0207*** | (2023.01) |
| ***G06Q 30/0226*** | (2023.01) |
| ***G09G 5/14*** | (2006.01) |
| ***H01M 10/42*** | (2006.01) |
| ***H01M 10/46*** | (2006.01) |
| ***H01M 50/249*** | (2021.01) |
| ***H01M 50/256*** | (2021.01) |
| ***H02J 7/70*** | (2026.01) |
| ***H04L 67/00*** | (2022.01) |
| ***H04L 67/12*** | (2022.01) |
| ***H04L 67/303*** | (2022.01) |
| ***H04L 67/306*** | (2022.01) |
| ***H04L 67/50*** | (2022.01) |
| ***H04L 67/53*** | (2022.01) |
| ***H04W 4/029*** | (2018.01) |
| ***H04W 12/08*** | (2021.01) |
| *H04L 67/1095* | (2022.01) |
| *H04L 67/567* | (2022.01) |
| *H04W 4/80* | (2018.01) |
| *H04W 84/12* | (2009.01) |

(52) U.S. Cl.

CPC .............. *B60L 58/12* (2019.02); *G06F 3/048* (2013.01); *G06F 3/04817* (2013.01); *G06F 3/0482* (2013.01); *G06F 3/0484* (2013.01); *G06F 3/04842* (2013.01); *G06F 3/04845* (2013.01); *G06F 3/0488* (2013.01); *G06F 3/04883* (2013.01); *G06F 3/1454* (2013.01); *G06F 3/167* (2013.01); *G06F 9/451* (2018.02); *G06Q 20/18* (2013.01); *G06Q 30/0207* (2013.01); *G06Q 30/0226* (2013.01); *G09G 5/14* (2013.01); *H01M 10/425* (2013.01); *H01M 10/46* (2013.01); *H01M 50/249* (2021.01); *H01M 50/256* (2021.01); *H02J 7/751* (2026.01); *H04L 67/12* (2013.01); *H04L 67/303* (2013.01); *H04L 67/306* (2013.01); *H04L 67/34* (2013.01); *H04L 67/53* (2022.05); *H04L 67/535* (2022.05); *H04W 4/029* (2018.02); *H04W 12/08* (2013.01); *G09G 2354/00* (2013.01); *G09G 2380/10* (2013.01); *H01M 2010/4278* (2013.01); *H01M 2220/20* (2013.01); *H04L 67/1095* (2013.01); *H04L 67/567* (2022.05); *H04W 4/80* (2018.02); *H04W 84/12* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 50/14* (2013.01)

(58) Field of Classification Search

CPC .......... B60L 50/66; B60L 53/80; B60L 58/12; B60L 53/64; B60L 53/66; B60L 2240/622; B60L 2240/68; B60L 2240/70; B60L 2240/72; B60L 2250/12; B60L 2250/16; B60L 2260/52; B60L 2260/54; G06F 3/048; G06F 3/04817; G06F 3/0482; G06F 3/0484; G06F 3/04842; G06F 3/04845; G06F 3/0488; G06F 3/04883; G06F 3/1454; G06F 3/167; G06F 9/451; G06F 3/0481; G06F 3/04847; G06Q 20/18; G06Q 30/0207; G06Q 30/0226; G09G 5/14; G09G 2354/00; G09G 2380/10; H01M 10/425; H01M 10/46; H01M 50/249; H01M 50/256; H01M 2010/4278; H01M 2220/20; H02J 7/0045; H04L 67/12; H04L 67/303; H04L 67/306; H04L 67/34; H04L 67/53; H04L 67/535; H04L 67/1095; H04L 67/567; Y02T 10/70; Y02T 10/7072; Y02T 90/12; Y02T 90/14; Y02T 90/16; Y04S 50/14

See application file for complete search history.

(56) References Cited

U.S. PATENT DOCUMENTS

| | | | | |
|---|---|---|---|---|
| 2012/0095643 A1* | 4/2012 | Bose | B60K 35/10 | 715/744 |
| 2014/0213238 A1* | 7/2014 | Giraud | G07C 5/008 | 455/418 |
| 2017/0041356 A1* | 2/2017 | Nelson | H04L 65/403 | |
| 2023/0162544 A1* | 5/2023 | Hua | H04W 12/069 | 340/5.72 |

* cited by examiner

129
SYSTEM
130
API
128
Control Interface
Systems
$CI_1$ Radio
$CI_2$ Seats
$CI_3$ Tires
$CI_4$ Brakes
$CI_5$ Maint.
$CI_6$ Wipers
$CI_7$ A/C
$CI_8$ Heat
$CI_9$ NAV
$CI_{10}$ Media
$CI_{11}$ Phone
$CI_{12}$ Calendar
190
Vehicle Site
Vehicle Manufacturer
Vehicle Type $V_1$
Year 1
Sys
Year n
Sys
Vehicle Type $V_n$
Year 1
Sys
Year n
Sys
180
116

606
Charge Discount
608
Charge Unit Install Points
610
Grid Power Demand
612
Geo Data
614
Mapping
616
Live Traffic Data
640
Computer
642
Smart Device
644
Remote Locations
602
620
Charge Unit Location Data
622
Traffic Data
624
Charge Grid Load
626
Route Based Discounts
630
Mapping Data
120
Cloud Services
162
Display / Input
(Voice/ Input)
604
Instant Routing
Route Request
Logic
Route
Cost
Time
Sponsor

Figure 19B:
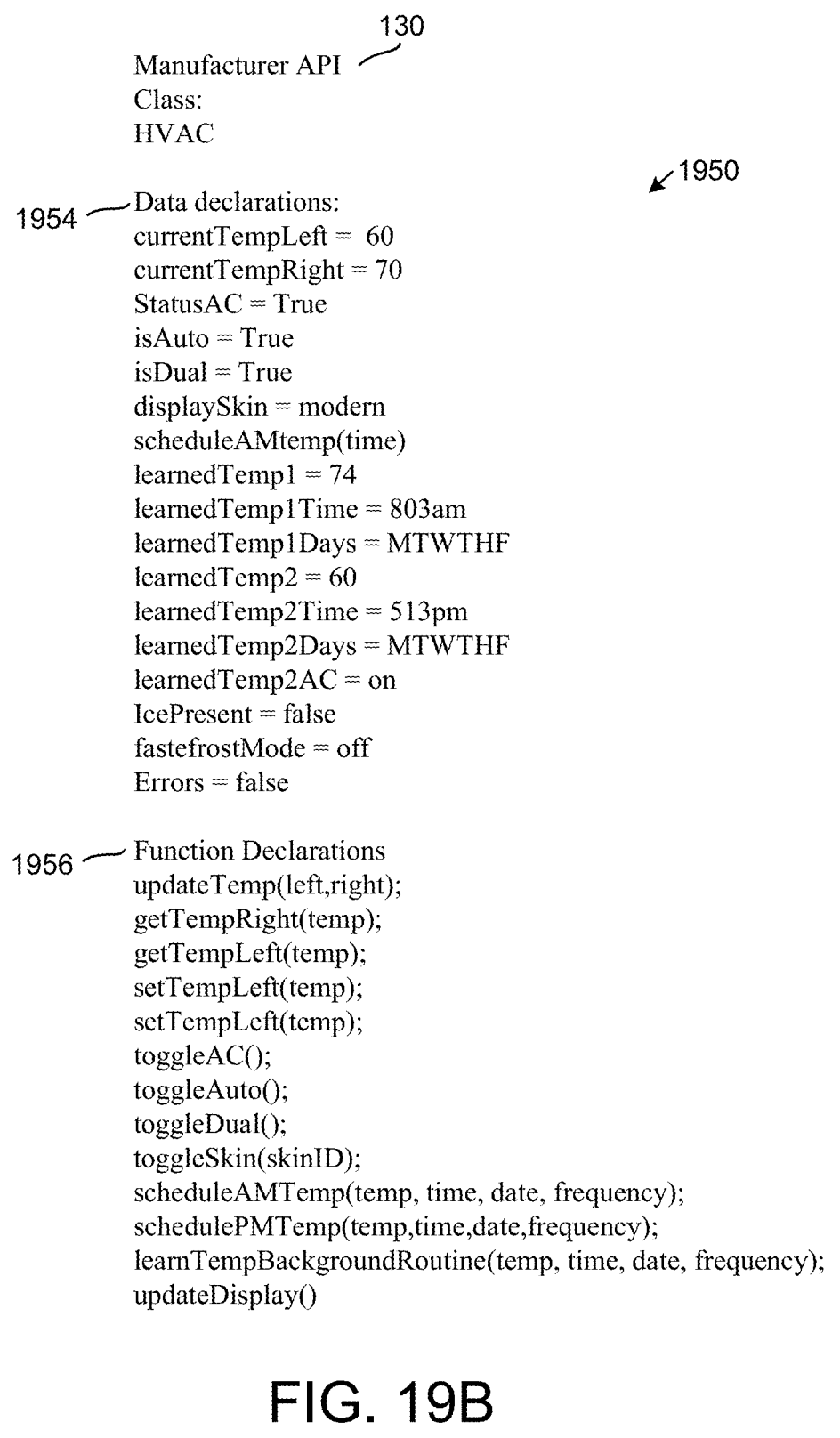

130

Manufacturer API
Class:
HVAC

1950

1954 Data declarations:
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 1956 Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

```
EZ FUN HVAC APP

updateTemp(80,76);
{
        setLeftTo = 80;
        setRightTo = 76;
        theCurrentTempR = getTempRight(temp);
        theCurrenTempL = getTempLeft(temp);
        if setLeftTo != theCurrentTempL
        {
                setTempLeft(left);
        }
        if setRightTo != theCurrentTempR
        {
                setTempRight(right);
        }
        updateDisplay()

        If isError()
        {
                return isError();
        }

}
```

Figure 22B:
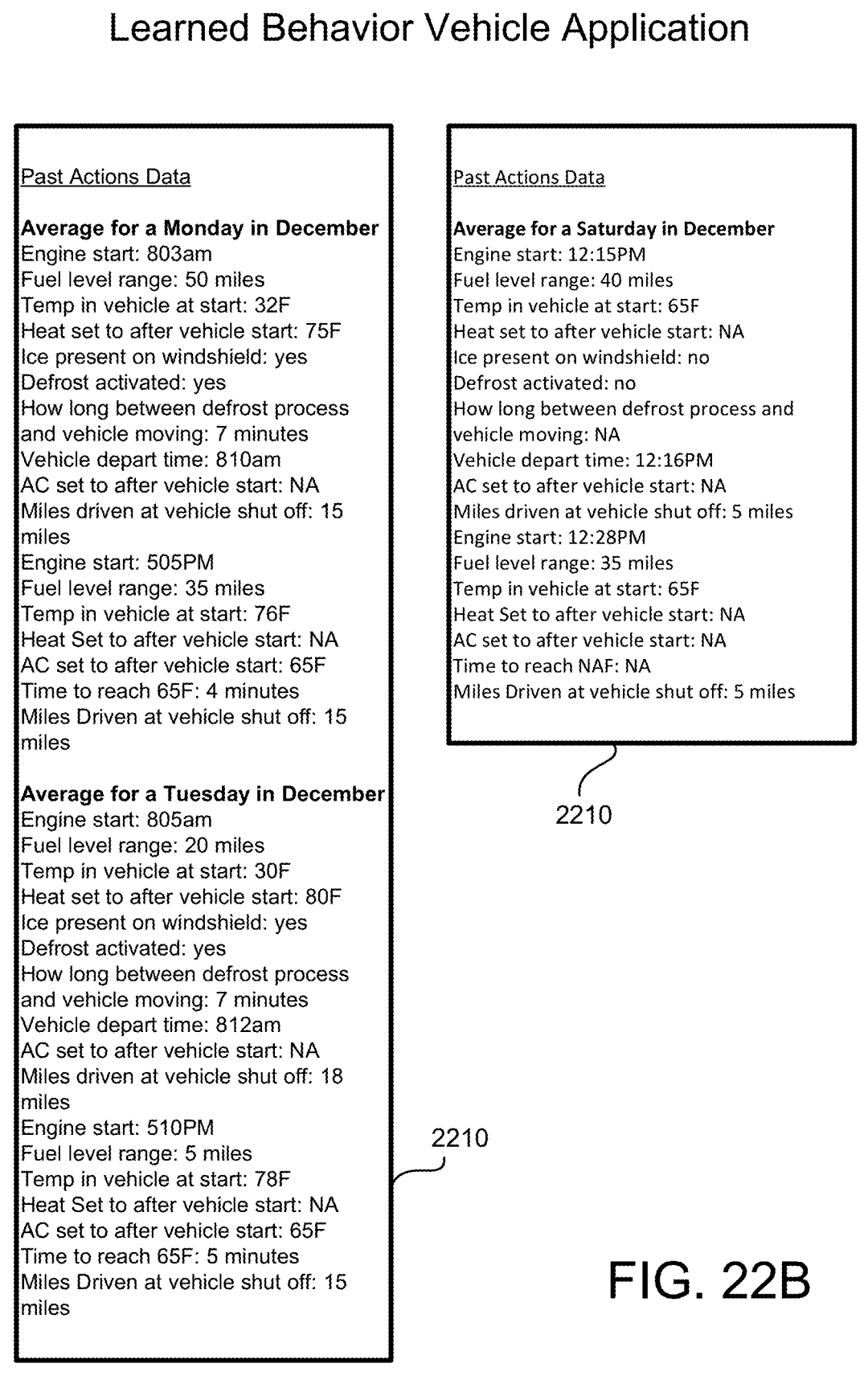

Learned Behavior Vehicle Application

Past Actions Data

Average for a Monday in December
Engine start: 803am
Fuel level range: 50 miles
Temp in vehicle at start: 32F
Heat set to after vehicle start: 75F
Ice present on windshield: yes
Defrost activated: yes
How long between defrost process and vehicle moving: 7 minutes
Vehicle depart time: 810am
AC set to after vehicle start: NA
Miles driven at vehicle shut off: 15 miles
Engine start: 505PM
Fuel level range: 35 miles
Temp in vehicle at start: 76F
Heat Set to after vehicle start: NA
AC set to after vehicle start: 65F
Time to reach 65F: 4 minutes
Miles Driven at vehicle shut off: 15 miles

Average for a Tuesday in December
Engine start: 805am
Fuel level range: 20 miles
Temp in vehicle at start: 30F
Heat set to after vehicle start: 80F
Ice present on windshield: yes
Defrost activated: yes
How long between defrost process and vehicle moving: 7 minutes
Vehicle depart time: 812am
AC set to after vehicle start: NA
Miles driven at vehicle shut off: 18 miles
Engine start: 510PM
Fuel level range: 5 miles
Temp in vehicle at start: 78F
Heat Set to after vehicle start: NA
AC set to after vehicle start: 65F
Time to reach 65F: 5 minutes
Miles Driven at vehicle shut off: 15 miles

2210

Past Actions Data

Average for a Saturday in December
Engine start: 12:15PM
Fuel level range: 40 miles
Temp in vehicle at start: 65F
Heat set to after vehicle start: NA
Ice present on windshield: no
Defrost activated: no
How long between defrost process and vehicle moving: NA
Vehicle depart time: 12:16PM
AC set to after vehicle start: NA
Miles driven at vehicle shut off: 5 miles
Engine start: 12:28PM
Fuel level range: 35 miles
Temp in vehicle at start: 65F
Heat Set to after vehicle start: NA
AC set to after vehicle start: NA
Time to reach NAF: NA
Miles Driven at vehicle shut off: 5 miles

Figure 22C:
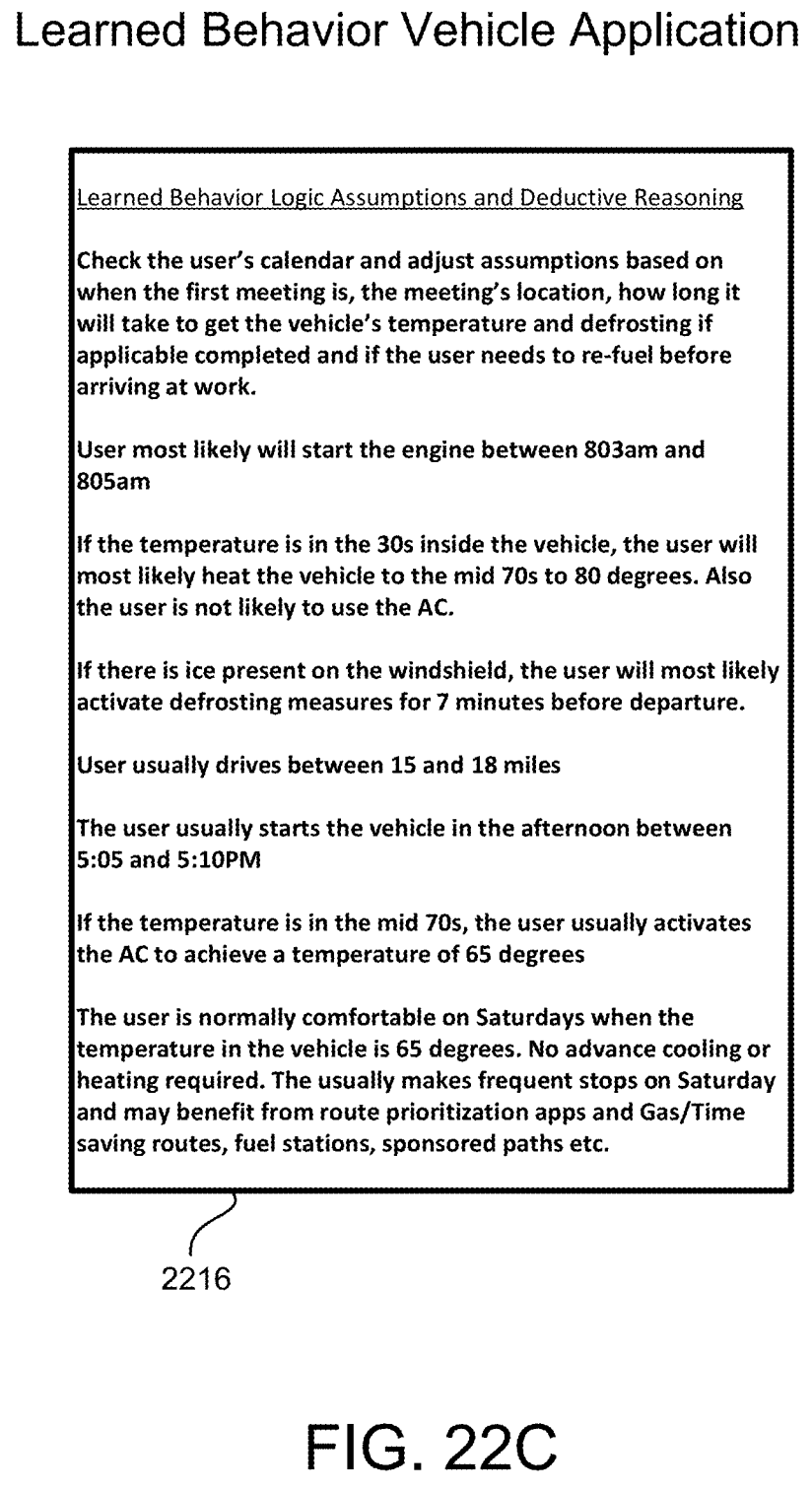

Learned Behavior Vehicle Application

Learned Behavior Logic Assumptions and Deductive Reasoning

Check the user's calendar and adjust assumptions based on when the first meeting is, the meeting's location, how long it will take to get the vehicle's temperature and defrosting if applicable completed and if the user needs to re-fuel before arriving at work.

User most likely will start the engine between 803am and 805am

If the temperature is in the 30s inside the vehicle, the user will most likely heat the vehicle to the mid 70s to 80 degrees. Also the user is not likely to use the AC.

If there is ice present on the windshield, the user will most likely activate defrosting measures for 7 minutes before departure.

User usually drives between 15 and 18 miles

The user usually starts the vehicle in the afternoon between 5:05 and 5:10PM

If the temperature is in the mid 70s, the user usually activates the AC to achieve a temperature of 65 degrees

The user is normally comfortable on Saturdays when the temperature in the vehicle is 65 degrees. No advance cooling or heating required. The usually makes frequent stops on Saturday and may benefit from route prioritization apps and Gas/Time saving routes, fuel stations, sponsored paths etc.

Figure 22D:
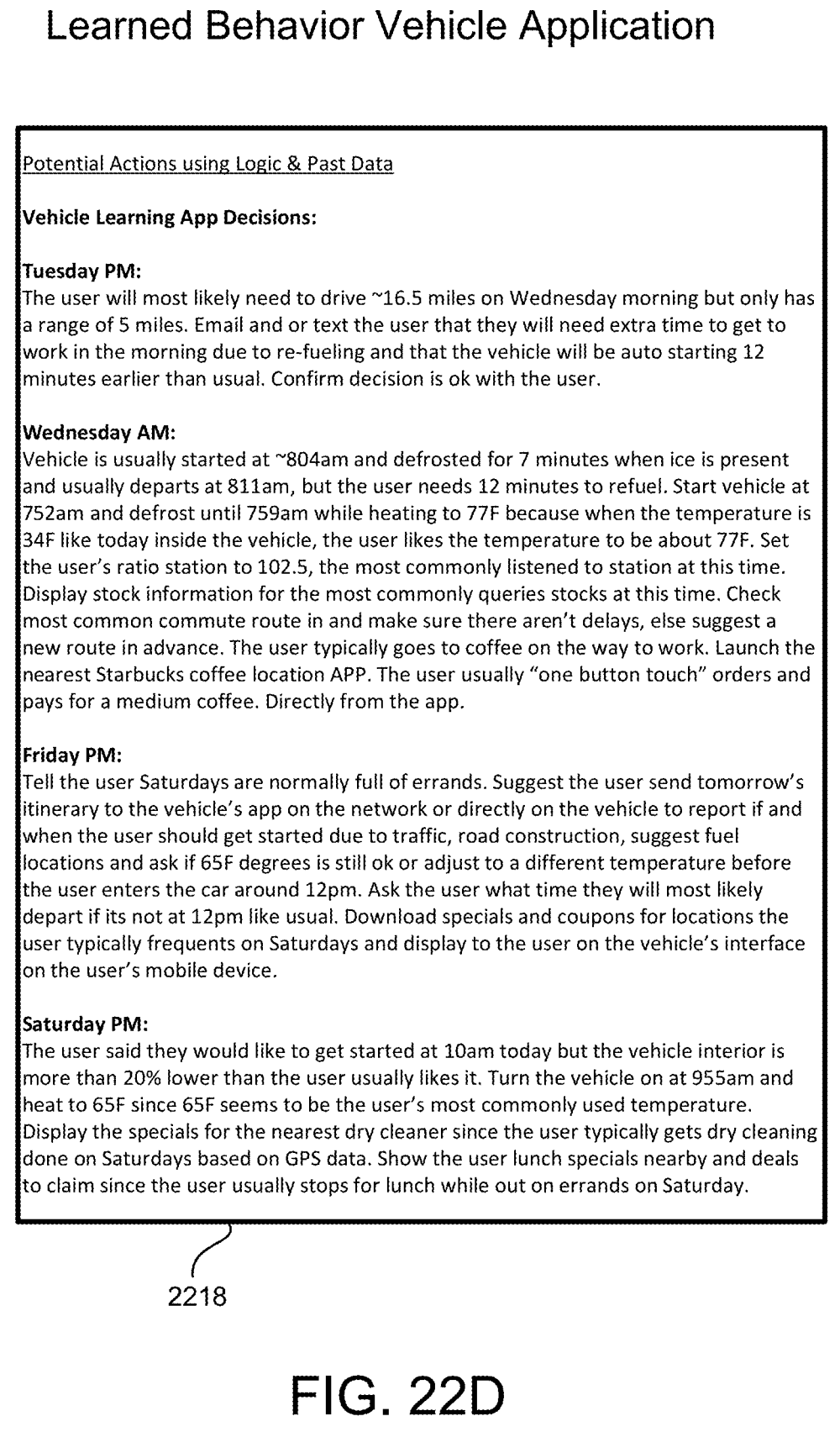

Learned Behavior Vehicle Application

Potential Actions using Logic & Past Data

Vehicle Learning App Decisions:

Tuesday PM:
The user will most likely need to drive ~16.5 miles on Wednesday morning but only has a range of 5 miles. Email and or text the user that they will need extra time to get to work in the morning due to re-fueling and that the vehicle will be auto starting 12 minutes earlier than usual. Confirm decision is ok with the user.

Wednesday AM:
Vehicle is usually started at ~804am and defrosted for 7 minutes when ice is present and usually departs at 811am, but the user needs 12 minutes to refuel. Start vehicle at 752am and defrost until 759am while heating to 77F because when the temperature is 34F like today inside the vehicle, the user likes the temperature to be about 77F. Set the user's ratio station to 102.5, the most commonly listened to station at this time. Display stock information for the most commonly queries stocks at this time. Check most common commute route in and make sure there aren't delays, else suggest a new route in advance. The user typically goes to coffee on the way to work. Launch the nearest Starbucks coffee location APP. The user usually "one button touch" orders and pays for a medium coffee. Directly from the app.

Friday PM:
Tell the user Saturdays are normally full of errands. Suggest the user send tomorrow's itinerary to the vehicle's app on the network or directly on the vehicle to report if and when the user should get started due to traffic, road construction, suggest fuel locations and ask if 65F degrees is still ok or adjust to a different temperature before the user enters the car around 12pm. Ask the user what time they will most likely depart if its not at 12pm like usual. Download specials and coupons for locations the user typically frequents on Saturdays and display to the user on the vehicle's interface on the user's mobile device.

Saturday PM:
The user said they would like to get started at 10am today but the vehicle interior is more than 20% lower than the user usually likes it. Turn the vehicle on at 955am and heat to 65F since 65F seems to be the user's most commonly used temperature. Display the specials for the nearest dry cleaner since the user typically gets dry cleaning done on Saturdays based on GPS data. Show the user lunch specials nearby and deals to claim since the user usually stops for lunch while out on errands on Saturday.

METHODS AND SYSTEMS FOR VEHICLE DISPLAY DATA INTEGRATION WITH MOBILE DEVICE DATA

CLAIM OF PRIORITY

The present application is a continuation application of U.S. application Ser. No. 17/088,349, filed on Nov. 3, 2020, entitled "Methods and Systems for Vehicle Display Data Integration with Mobile Device Data," which is a continuation application of U.S. application Ser. No. 16/411,109, filed on May 13, 2019, (now U.S. Pat. No. 10,824,330, issued on Nov. 3, 2020) entitled "Methods and Systems for Vehicle Display Data Integration with Mobile Device Data," which is a continuation application of U.S. application Ser. No. 15/243,933, filed on Aug. 22, 2016 (now U.S. Pat. No. 10,286,798, issued on May 14, 2019), entitled "Methods and Systems for Vehicle Display Data Integration with Mobile Device Data," which is a continuation application of U.S. application Ser. No. 14/640,004, filed on Mar. 5, 2015 (now U.S. Pat. No. 9,423,937, issued on Aug. 23, 2016) entitled "Vehicle Display Systems and Methods for Shifting Content between Displays," which is a continuation application of U.S. application Ser. No. 13/784,823, filed on Mar. 5, 2013 (now U.S. Pat. No. 9,285,944, issued on Mar. 15, 2016) entitled "Methods and Systems for Defining Custom Vehicle User Interface Configurations and Cloud Services for Managing Applications for the User Interface and Learning Setting Functions," which claims priority to U.S. Provisional Patent Application No. 61/745,729, filed on Dec. 24, 2012, and entitled "Methods and Systems For Electric Vehicle (EV) Charging, Charging Systems, Internet Applications and User Notifications", and which are herein incorporated by reference.

U.S. application Ser. No. 14/640,004, is also a continuation-in-part of U.S. application Ser. No. 13/452,882, filed Apr. 22, 2012 (now U.S. Pat. No. 9,123,035 issued on Sep. 1, 2015), and entitled "Electric Vehicle (EV) Range Extending Charge Systems, Distributed Networks Of Charge Kiosks, And Charge Locating Mobile Apps", which claims priority to U.S. Provisional Application No. 61/478,436, filed on Apr. 22, 2011, all of which are incorporated herein by reference.

U.S. application Ser. No. 14/640,004, is also a continuation-in-part of U.S. application Ser. No. 13/842,158, filed on Mar. 15, 2013, (now U.S. Pat. No. 9,423,937, issued on Aug. 23, 2016) and entitled "Methods and Systems for Defining Vehicle User Profiles and Managing User Profiles via Cloud Systems and Applying Learned Settings to User Profiles," which is herein incorporated by reference.

FIELD OF THE EMBODIMENTS

The present invention relates to systems and methods for customizing vehicle user interfaces and exchange of information with cloud-based processing systems to enable integration with third party applications.

BACKGROUND

Vehicles, such as motorized vehicles and electric vehicles have been around for some time. Vehicles provide a means that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles.

It is in this context that embodiments of the invention arise.

SUMMARY

The methods, systems and apparatus include electronics and software of vehicles that drive display devices in vehicles and communicate wirelessly with Internet services.

In one embodiment, methods and systems are provided, for sharing mobile device applications with a vehicle computer. In this embodiment, the method includes detecting a mobile device present in a vehicle, by a vehicle computer of the vehicle and generating a user interface on a display screen of the vehicle, as instructed by the vehicle computer. The method further includes identifying by the vehicle computer, a plurality of native applications of the vehicle for the user interface and identifying a plurality of mobile device applications from the mobile device for the user interface, while the mobile devices is present in the vehicle. The method enables system controls, using the vehicle computer, to enable access to the plurality of native applications and the plurality of mobile device applications, the system controls including one or more of button inputs of the vehicle, touch screen inputs via the user interface of the display screen of the vehicle, and voice input via microphones of the vehicle.

One method includes receiving a request to access a server that provides logic for defining a custom user interface for a vehicle associated with a user account. The method also includes receiving selection options for associating applications to the custom user interface. The applications including interfaces associated with functionalities of the vehicle and interfaces for connecting with internet accessible services. The method includes receiving arrangement selections for placing at least one of the interfaces at a user defined location of a display screen of the vehicle. The selection options of the associated applications and the arrangement selections defining the custom user interface for the user account. The method further includes communicating the custom user interface to memory and electronics of the vehicle over a wireless internet connection. The custom user interface is to be rendered on the display screen of the vehicle.

Other examples include methods for providing access to cloud services over the Internet for customizing a user interface of a vehicle. The method includes providing selection options to identify a vehicle type among a plurality of vehicle types, where each vehicle type is associated with a system component native to the vehicle type. The system component provides native interfaces for the vehicle type. The method includes identifying a plurality of applications available for the vehicle type. Each of the applications provided with predefined code for communicating with at least one control interface of the system component. The method includes identifying an application from the plurality of applications. The application providing an app interface to be added to the user interface of the vehicle. The method generates a custom configuration of the user interface for the vehicle type that includes native interfaces for components native to the vehicle type and the app interface for the application. The custom configuration is defined to render or set at least one screen or part of one screen of the user interface for display on a vehicle display. The custom configuration is wirelessly transferred to memory and electronics of the vehicle from the database, from cloud processing (e.g., servers/storage having access via the Internet). The custom configuration is saved to a user account in the database interfaced over the Internet with the cloud services, the method being executed by a processor. The custom configuration can be updated from time to time and can be transferred to other vehicles.

In some embodiments, the method includes receiving a request to modify the custom configuration; enabling changes to the identified application, the changes including adding additional applications or removing the application; updating the custom configuration with the changes; saving the custom configuration to the user account.

In some embodiments, the method includes enabling identification of a second vehicle for the user account, the second vehicle having a second vehicle type.

In some embodiments, the method includes processing a request to transfer the custom configuration to the second vehicle, the processing of the request includes, automatically updating the system component for the second vehicle type, the system component of the second vehicle including more or less native interfaces based on the second vehicle type as defined by a manufacturer of the second vehicle; and determining if the application is compatible for the second vehicle type, and providing options to select an update for the application in response to processing the request to transfer the custom configuration when the application is not compatible for the second vehicle type.

In some embodiments, the manufacturer of the vehicle and the second vehicle is either the same or different.

In some embodiments, the method includes processing a request to use the custom configuration on the second vehicle, the processing of the request includes, receiving login credentials for the user account to enable use of the custom configuration at the second vehicle automatically updating the system component for the second vehicle type, the system component of the second vehicle including more or less native interfaces based on the second vehicle type as defined by a manufacturer of the second vehicle; and determining if the application is compatible for the second vehicle type, and if the application is not compatible for the second vehicle type, either omitting the application from the custom configuration or providing a replacement application for the application with or without user input.

In some embodiments, the method includes maintaining a database of user accounts, each user account having one or more custom configurations of user interfaces; processing a request to use a second custom configuration on the vehicle, the request being received from the vehicle upon entering credentials to access a second user account; transferring the second custom configuration to the vehicle for use while the credentials of the second user account are active on the vehicle, wherein a verified request to use the second custom configuration terminates use of the custom configuration in favor of the second custom configuration.

In some embodiments, the method includes terminating a session of use of the custom configuration on the vehicle, termination of the session acts to, reset the display of the vehicle to provide the user interface with system interfaces that are default-set by the manufacturer of the vehicle; or set a second custom configuration for a second user account.

In some embodiments, the vehicle display of the vehicle includes any one or more of a main dashboard display, or a center console display, or a combined main dashboard and center console display, or a glass surface, or a windshield display, or a window display, or a touch surface display, or a headrest display, or a movable display, or a wireless display, or a wire-connected display, or combinations of one or more thereof.

In some embodiments, the method includes receiving a request to make changes to add or remove applications from the custom configuration.

In some embodiments, the method includes enabling a user interface tool to arrange some of the system components and app components of the application on a display, the arranging includes defining positional locations for graphical user interface (GUI) items of the custom configuration, the user interface tool being provided via a website of the cloud processing that manages the user account.

In some embodiments, the method includes enabling linking of one or more applications executed on a mobile device to be presented on the vehicle display of the vehicle in accordance with the custom configuration, the linking enabled upon pairing the mobile device with electronics of the vehicle. In one example, the applications from the mobile device can be presented in a split screen region of the vehicle display. The split screen can allow presentation of apps and content from the mobile device or cloud services of the mobile device, along with services and apps of the vehicle. In this implementation, the split screen provides for a seamless presentation of data from devices of the user and data managed by cloud services or programs of the vehicle. In another embodiment, split screen presentation allows mirroring of content generated by the mobile device on screens of the vehicle. In one configuration, restrictions on use can be applied by algorithms managed by the vehicle code or cloud code to enable safe driving. For instance, if the data of the mobile device requires interactivity that may cause distractions, such as texting, entering data by hand, gesturing, etc., such features may be disabled or a function can be provided to translate the entry to voice/audio output and voice input by the driver or occupants. In one embodiment, if a passenger is able to handle the input, the features may be enabled, provided the input is coming from a passenger seat. Logic in the vehicle can detect if a person is sitting in the vehicle, and voice authentication or video confirmation can be performed to determine if the person entering the data is a passenger. Thus, verification of the person entering data to user interface components can be made on the fly.

In some embodiments, the method includes receiving user input via the custom configuration; learning patterns of user input over time; automatically programming one or more components of the custom configuration based on the learned patterns of user input, automatic programming changing over time based on the received user input via the custom configuration and saved periodically to the user account in the database via a wireless connection to the Internet.

In some embodiments, the method includes automatically adjusting positional locations for graphical user interface (GUI) items of the custom configuration based on the learned patterns; and saving the adjustments to the user account, the user account being saved in a database that is interfaced over the Internet with cloud services that execute code using one or more processors.

In some embodiments, the programming of one or more components of the custom configuration includes automatically setting input based on times of day, or days of week, or dates of month, or times of year, or combinations thereof.

In some embodiments, the method includes associating biometrics to the user account, the biometrics being used to monitor use of the vehicle and determine if the custom configuration is enabled, or if a guest custom configuration should be enabled, or if public custom configuration should be enabled, the user account includes profile data defining when particular configurations should be enabled based on the biometrics.

In some embodiments, the custom configuration is saved to the user account in cloud storage having the database, and cloud processing provides communication with the vehicle over the Internet via wireless Internet communication.

In some embodiments, cloud processing provides a website interface or backend server or services interface to enable selection of the vehicle type and the application to define the custom configuration and also enables updates to the custom configuration to add, delete or update applications to be associated with the custom configuration.

In some embodiments, the code for the custom configuration is transferred to the vehicle upon receiving credentials to access the user account from the vehicle so as to associate the vehicle to the custom configuration, the association of the custom configuration to the vehicle being for a period of time.

In some embodiments, the period of time is for a session that remains until logged out of the user account, or a period of inactivity, or when biometrics detects use by other than a person associated with the user account, or a second user account logs in to define a new session with a second custom configuration of the second user account.

In some embodiments, vehicle electronics are programmed with a master account, the master account being provided access communication with cloud services over the Internet, the master account enabling use of the custom configuration with one or more restrictions.

In some embodiments, the restrictions include enabling, disabling or regulating system components of the vehicle, enabling or disabling certain applications of the custom configuration, wherein the restrictions being updateable over a website that enables remote configuration and monitoring of the vehicle using cloud services over the Internet for the master account, the master account enabling one or more guest accounts to be used on the vehicle, such that one or more custom configurations are usable on the vehicle during respective sessions.

In some embodiments, the method includes associating logins to the user account, the logins being used to determine if the custom configuration is enabled, or if a guest custom configuration should be enabled, or if public custom configuration should be enabled, the user account includes profile data defining which particular configurations should be enabled based on the logins, wherein the logins are made via the vehicle that communicates with cloud services via the Internet through a wireless link.

In some embodiments, the method includes saving use data of the vehicle for each login, the use data further being linked to automatic notifications, such that certain use data triggers an automatic notification to an administrator of the user account, the notifications including text notifications, phone call notifications, web notifications, smartphone notifications, social network notifications, or combinations thereof.

In some embodiments, biometrics include one or more of image data of a driver's face, a passenger's face, a finger print, a retina scan, a signature, a gesture, or combinations thereof.

In one embodiment, a method is provided. The method includes providing access to cloud services over the Internet for customizing a user interface of a vehicle. The method includes providing selection options to identify a vehicle type among a plurality of vehicle types, each vehicle type being associated with a system component native to the vehicle type, the system component providing native interfaces for the vehicle type. A plurality of applications are provided as available for the vehicle type, and each of the applications may be provided with predefined code for communicating with at least one control interface of the system component. The method includes defining a custom configuration of the user interface for the vehicle type that includes native interfaces for components native to the vehicle type and an app interface for an application added to the user interface of the vehicle. The custom configuration is defined to set or program at least one screen of the user interface for display on a vehicle display when the custom configuration is wirelessly transferred to memory and electronics of the vehicle from the database. The custom configuration is saved to a user account in a database interfaced over the Internet with the cloud services. The method further includes receiving user input via the custom configuration and learning patterns of user input over time. The method automatically programs one or more components of the custom configuration based on the learned patterns of user input. The automatic programming changes over time based on the received user input over time via the custom configuration. The changes to the automatic programming are saved periodically to the user account in the database via a wireless connection to the Internet. The method being executed by a processor.

In one embodiment, the custom configuration is generated using tools and programs made available on a website. The tools and programs may be executed by computers, such as computers of a data center to provide cloud based processing. The data centers can be distributed geographically and the communication to specific vehicles can be dynamically assigned to various geographic data centers, as the vehicles move around geographically.

BRIEF DESCRIPTION OF DRAWINGS

FIG. 19B describes one example of how stored data and function declarations may be compiled to provide intermediary access to a vehicle's computer controlling vehicle systems, in accordance with one embodiment.

FIG. 19C describes a set of computer readable and executable code that can be compiled together by a third party APP developer in the form of an APP, in accordance with one embodiment.

FIG. 22B describes how one of many types of inputs into an assumption and reasoning logic module can be compiled over time, in accordance with one embodiment.

FIG. 22C describes one example of what an assumption and reasoning logic module may produce using the data points collected on an ongoing basis in FIG. 22B, in accordance with one embodiment.

FIG. 22D describes an example list of decision the decision and action engine may take based on information provided by the assumption and reasoning logic module and sets of assumptions created, in accordance with one embodiment.

DETAILED EMBODIMENTS

Figure 1:
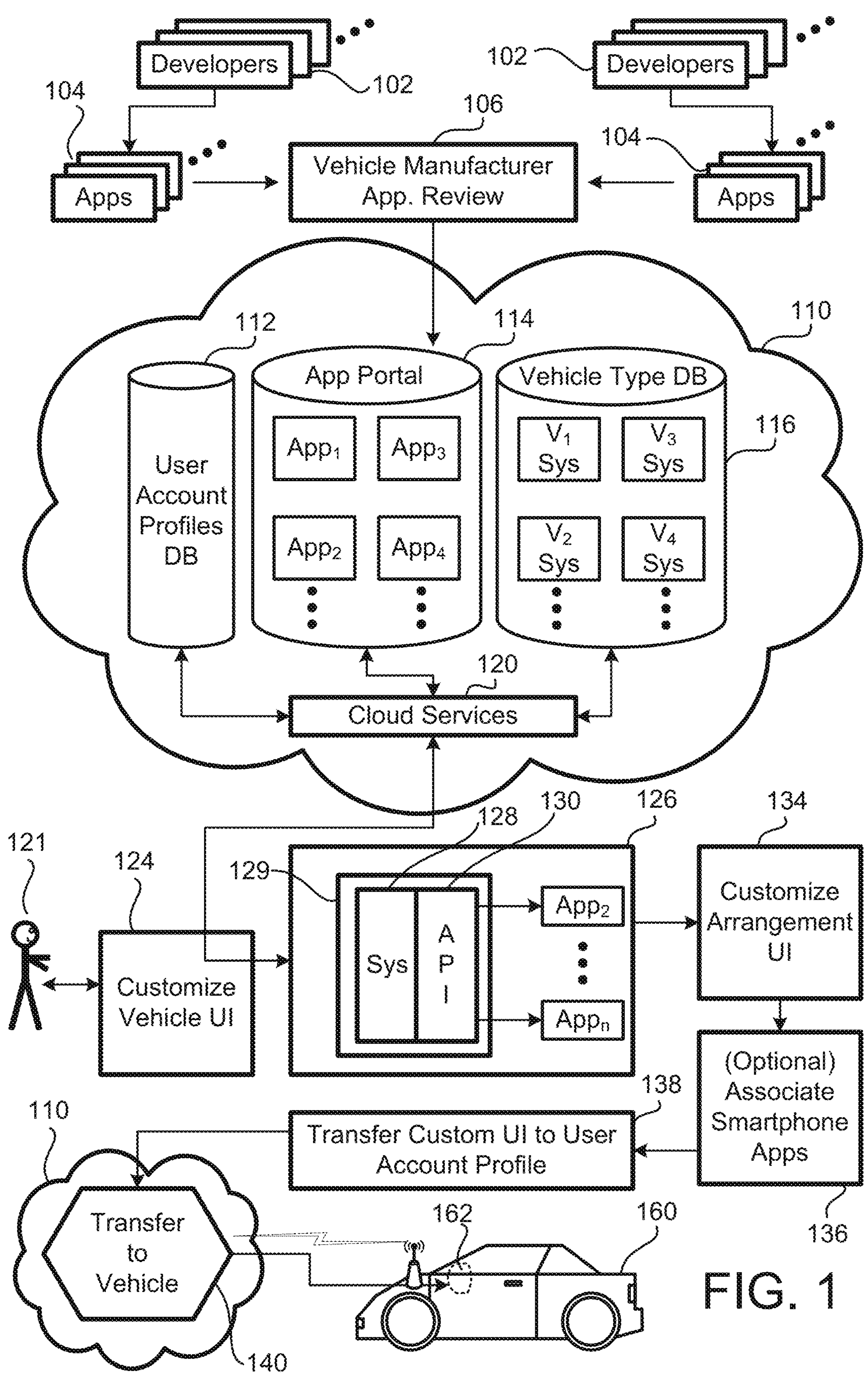
FIG. 1 shows a block diagram of a system for allowing developers to create applications for specific features and functionality to be integrated with one or more vehicles of vehicle databases, in accordance with one embodiment.

Embodiments of the present invention define methods, systems and apparatus for use in vehicles. The methods, systems and apparatus include electronics of vehicles that drive display devices in vehicles and communicate wirelessly with Internet services.

The Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use by the user, and automatically implements settings or programming to aspects of the user interface. The programming can include automatic programming at certain times, days, months, years, etc., and can be updated or molded over time as the user continues to use the vehicle UI.

In one embodiment, a user can access cloud services for a vehicle manufacturer and identify the particular vehicle from selected choices. The user can then identify a customization profile for the vehicle by defining the look and feel of a UI display, arrangement of vehicle controls on displays, add and associate third party APPS to the vehicle display, and save the configuration.

The configuration, in one embodiment, is saved to the profile of the user. In one embodiment, the profile is saved on a database of a specific vehicle manufacturer that offers the customization option. In still other embodiments, once a configuration is saved to the profile account of a user, that configuration can be shared to other vehicles of the user. In still other embodiments, when a user buys a new car, the custom configuration can be transferred either entirely or partially to the new vehicle. In some embodiments, if the vehicle has more or less system functions, the customization can be adjusted automatically or the user can be provided with options to update the customization to add or delete features. In one embodiment, the customization will be facilitated via a website. In one embodiment, the website may be of the vehicle manufacturer. In one embodiment, the website of the vehicle manufacturer can allow the user to add APPS that are created by third parties. The third parties can create APPS that communicate with APIs of the system components of specific vehicles of the manufacturer. Once APPS are selected, the user can add them to the custom user interface (UI) display.

The user can also be allowed to arrange the APPS or icons of APPS in a specific custom arrangement that is saved to the user's profile. In one embodiment, the user's profile can also be run on various vehicles, other than those owned by the user. For instance, if the user is renting a vehicle and the vehicle has access to cloud services, the user can enter his user name and password (or other identifiers), which log the user into the cloud services and saved profiles. The saved profiles will then enable logic to build a custom UI for the user based on the vehicle being driven. In one embodiment, the system components and APIs of the system components of the rented vehicle can be paired or linked to the users saved APP selections.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile. The data can then be used by algorithms that build assumptions based on historical inputs by a user as well as environmental inputs, location inputs, vehicle diagnostic inputs, internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

FIG. 1 shows a block diagram of a system for allowing developers to create applications for specific features and functionality to be integrated with one or more vehicles of vehicle databases. As shown, developers 102 create APPS 104 which is provided to a vehicle manufacturer 106. The APPS, in one embodiment, can be reviewed by the manufacturer to determine if they are save to play in the vehicle or can add restrictions. The restrictions can include, for example, only allow access when the vehicle is in "park" mode, stopped, or access may be enabled by passengers. Passengers may be verified for presence, before enabling features for the passengers.

The applications provided to the vehicle manufacturers can also verify functionality and approve aspects of the application to be provided to an applications database. Users of vehicles, made by the manufacturer, can then access a website to select specific applications for addition to their vehicles. In one example, an Internet site 110 may therefore be managed by or for the vehicle manufacturer. User account profiles 112 can be managed to provide access to APPS of an app portal 114. In other examples, the site 110 can be managed by third party companies, partner companies that cooperate with a vehicle manufacturers, and/or internet companies that provide some or all of the backend or front end services and cloud storage and processing.

The vehicle manufacturer may also manage or provide a vehicle type database 116, or provide data for the database 116. As the vehicle manufacturer makes updates to existing APPS, systems or adds new vehicles to its vehicle lines, the vehicle type database may also be updated accordingly. Updates can also be forwarded to the vehicle over time or can be automatically installed. The updates, in one embodiment, can provide new UI features, controls, etc. As shown, the app portal 114 may include a plurality of applications that have been developed by developers 102 and/or also approved by the manufacturer of the vehicle.

The app portal 114 can also include APPS that are produced by the vehicle manufacturer or applications that are made for the vehicle manufacturer. Cloud services 120 includes various modules that allow customers of the vehicle manufacturers to access the vehicle manufacturers cloud services, and provide interconnection to the vehicles in operation. In one example, a user 121 uses a computing device to access cloud services 120 in order to customize 124 the user interface of a vehicle. Broadly speaking, the user interface of a vehicle can include any display device in the vehicle.

In one embodiment, the display device can include displays that can provide instrumentation normally provided by standard vehicle indicators. The display device is not limited to a display normally placed in the center console, but can also any display screen. The display screen can also include that used to normally provide speed, and systems settings in the dash over the wheel. The display screen can also include other screens in a vehicle, such as those in passenger areas. Additionally, the user interface can also include display devices that display systems and auxiliary information, such as that provided by applications generated by developers 102, and/or applications produced by the vehicle manufacturer. In one embodiment, the vehicle manufacturer will produce a software module for systems information that allows access to the system components of the vehicle.

The systems component is shown as "SYS" 128, which is interfaced with an application-programming interface (API) 130. The vehicle module 129 will therefore include the systems component and the API that will provide access and interface with applications produced by third parties and applications produced by the vehicle manufacturer. In one embodiment, the system components interfaced with selected ones of the applications will produce a customized configuration 126. The customize configuration 126 will define the selected applications that were interfaced with the systems of the selected vehicle by the user 121. Once the customize configuration 126 has been selected (e.g., the APPS selected by the user to add or augment the current system APPS or system controls), the user may be provided with options to customize the arrangement of the UI (user interface) 134.

The customization, in one embodiment includes enabling the user to customize the user interface by arranging specific components of the user interface and specific locations on the display. For example, a user is allowed to select specific components, modules, applets, widgets, code pieces, and arrange them in specific locations that are preferred to the specific user for ease-of-use, or frequency of use, or for a specific look and feel.

This arrangement of the UI will therefore enable specific applications to act as modules that can be arranged on a display. The applications can then expand or contract to occupy the entire display when selected and exposing additional functions buttons annualize when selected. As will be defined below, additional customization of the arrangement of the UI 134 will allow user interaction with the user interface to customize itself based on learned use activity (e.g., over a history period) by the user.

In one optional embodiment, a user is allowed to associate a smartphone or portable device having applications with the customization configuration 126, in operation 136. For example, if certain applications are already loaded on a smartphone or portable device that is proximate or in the vehicle, the applications can synchronize or pair with the applications that are part of the customize configuration 126. The capability of synchronizing certain applications with the customize configuration 126 of the vehicle, allows for an integration of applications known and used by the user on the personal device, and applications that were made part of the customize configuration 126, using the customization tools of the vehicle manufacturer.

Once the user has customized the arrangements and has associated any portable device applications to the customized configuration 126, the custom UI may be transferred to the user account profile in operation 138. The transfer of the customize UI to that user account profile can include saving specific identifier information, application information, and any customization desired by the user for that specific vehicle or plurality of vehicles. Once the custom UI has been saved to the user account profile database 112, the user can then transfer or the manufacturer cloud services 120 can transfer the profile and custom UI to the vehicle in operation 140.

The transfer of the custom UI to the vehicle can be made by Internet connection between the vehicle electronics and the Internet 110. As shown in FIG. 1, the transfer of the custom UI to the vehicle 160 can occur once the customization has occurred. In one embodiment, the customization configured by the user 121 can also be saved to the user account of user 121 in a database of the manufacturer. If the user 121 then buys another car from the same manufacturer, the custom user interface can be transferred to the other vehicle in a seamless manner. If the other vehicle has additional features not provided by the earlier, a mapping algorithm provided by cloud services 120 can adjust the settings for the new vehicle to match or substantially match those of the earlier vehicle based on the user's preferences. In one embodiment, the matching can be a best-fit or compatible scenario, which provides the user with substantially similar configuration. The configuration can then be updated by the user if the custom settings or configurations made by the cloud services do not meet the user's desire or configuration.

Figure 2:
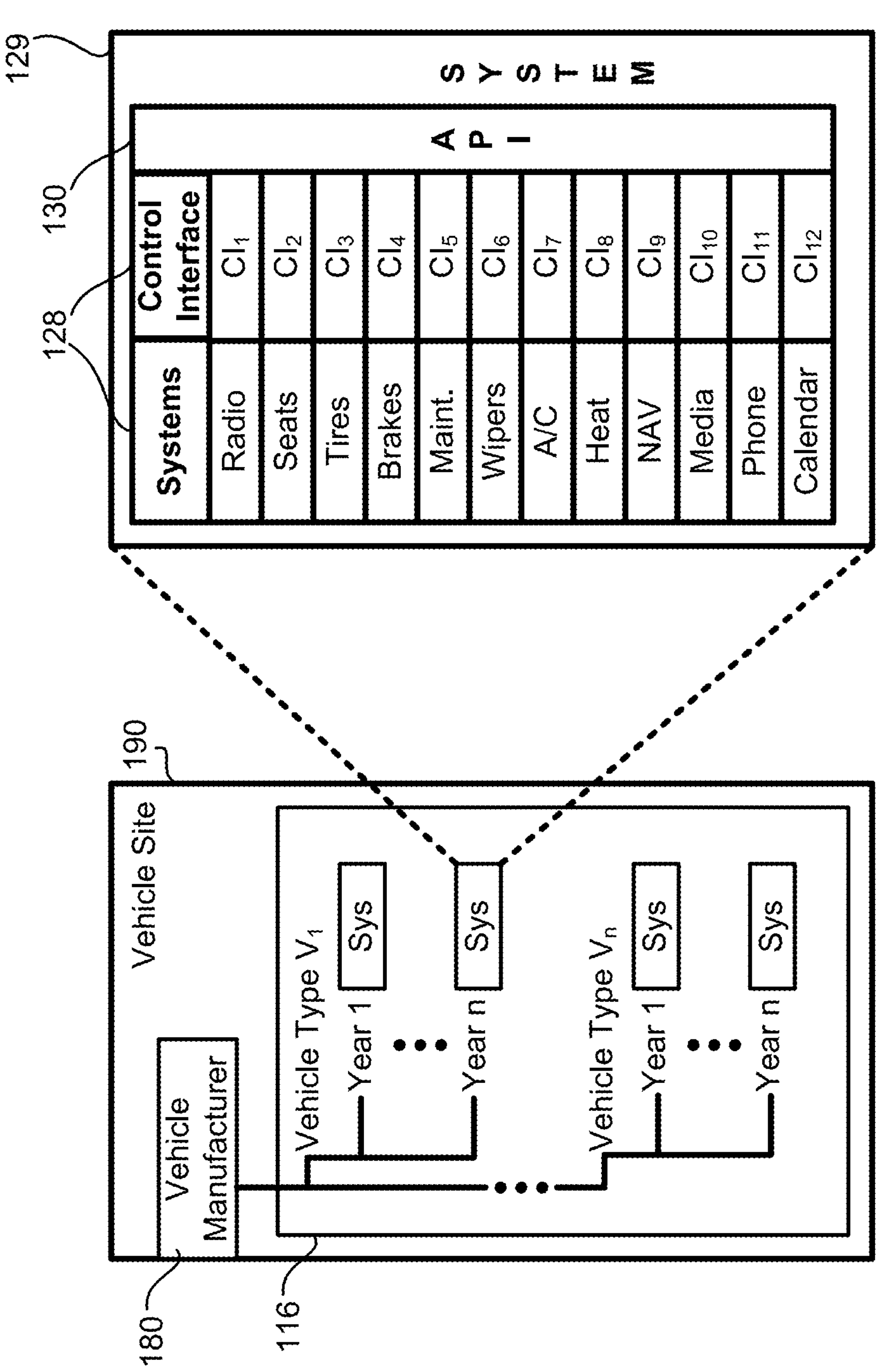
FIG. 2 illustrates one embodiment where a system component is provided, for interfacing with applications, in accordance with one embodiment.

FIG. 2 illustrates one embodiment where a system component 129 is provided, for interfacing with applications. In one embodiment, the system component 129 includes a definition of systems and control interfaces (CIs). The systems can include a number of standard systems utilized, which are commonly provided in manufacturing settings of vehicles by vehicle manufacturers. These systems are provided with corresponding control interfaces, which enable access to the system components. The control interfaces, for example, may enable access to the functionality provided by each of the system elements. For example, if the system is a radio, the radio will be provided with control interfaces or a control interface that enable functional access to the features of the radio. Functional features can include for example, volume, station selection, seek, pause, base, balance, storing of stations, etc. Other system features will be provided with their corresponding control interfaces, which will be then accessible via an application programming interface (API) 130.

The API provides a defined method and structure for accessing the various control interfaces of the system elements of a vehicle. Other types of systems can also include add-on components, plug-ins, such as those that may be downloaded to the vehicle from third party companies, from the manufacturer, or installed by the manufacturer automatically (or with pre-permission). Still further, other systems can include displays, which may be part of the vehicle. The displays can be provided with a control interface to enable the API to access the display functionality. In one embodiment, a vehicle can have a number of displays. The number displays can be, for example, the main dashboard for vehicle, a center console of the vehicle, a rear display, a passenger display, a glass display, a mirror display, a heads-up display, glasses of the driver, the windshield of a vehicle with display capability, a window of the vehicle, a touch surface of the vehicle, or portable devices link or synchronized to the vehicle electronics that provide access to the display system and control interfaces via the API 130.

As illustrated, the system component 129 may be defined by a vehicle manufacturer for a specific vehicle type. In one embodiment, a vehicle website 190, or third-party site may provide access to system component definitions for specific vehicles. In one example, the vehicle website 190 may be provided by a vehicle manufacturer 180. The vehicle manufacturer 180 may provide a listing of the types of vehicles sold by the manufacturer, and the various years for those vehicles as model types and functionality in each model change over time. In one embodiment, a user can visit the vehicle manufacturer 180 via websites or a cloud service, and select the vehicle to obtain the system component 129. In one embodiment, a particular vehicle type and year of vehicle may make use of more than one system component 129 if the manufacturer provided more than one system component or update.

Figure 3:
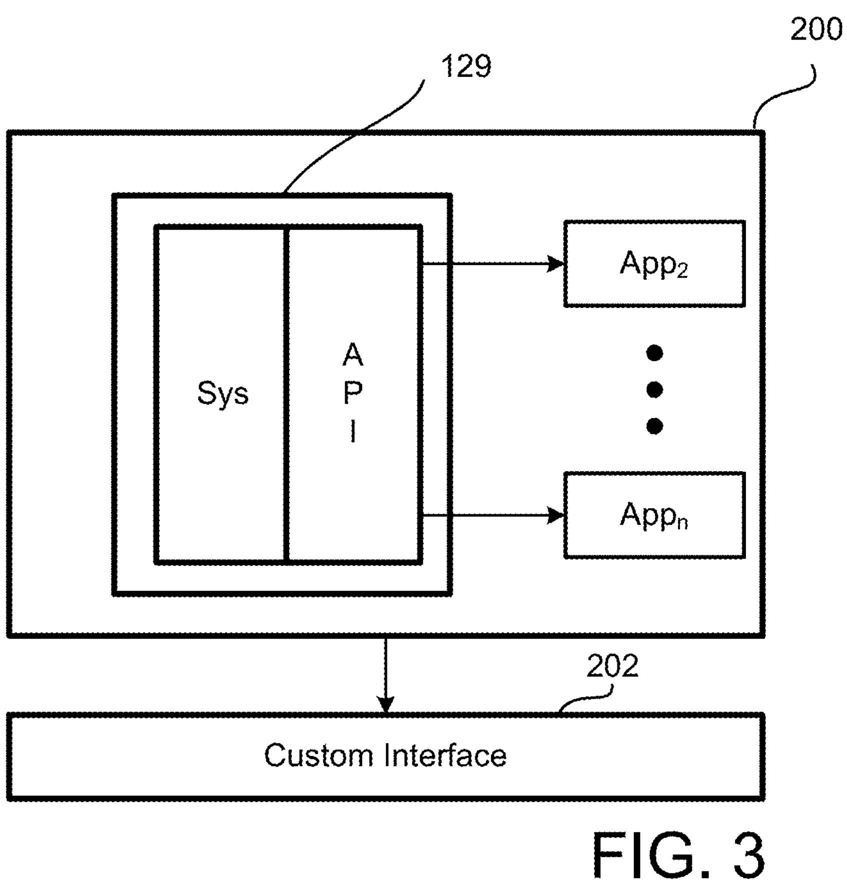
FIG. 3 illustrates an example where the system component, including the systems and control interfaces and associated API are linked or associated to a number of applications to define a custom configuration, for one embodiment.

FIG. 3 illustrates an example where the system component 129, including the systems and control interfaces and associated API are linked or associated to a number of applications to define a custom configuration 200. Custom configuration 200 was defined by allowing a user to select various applications that will be integrated with to provide supplemental content or functionality to the vehicle. In one embodiment, the applications can also replace application functionality provided by the systems in system component 129.

For example, an application can be selected by the user to provide a custom radio interface, which replaces the radio interface provided by the vehicle manufacturer. In still another example, an application can be provided to replace the temperature meters with custom temperature meters, and provide additional data on the display not provided by the standard vehicle manufacturer user interfaces.

In still another embodiment, the application selected by the user can define complementary functionality that will function in conjunction with the system components. In this example, the application functionalities that are paired with the system component 129 to define the custom configuration 200 will provide a hybrid user interface that is custom to the user. The customization is defined by the user, for example, by selecting specific applications, selecting different background colors, wallpapers, for the user interfaces, selecting different input interfaces, adjusting the location and positioning of application components displayed on a vehicle display, and programming the various application elements and functions to operates and provide feedback based on user-defined programming.

In still another embodiment, the custom configuration can be defined by the user to provide a different background color on different days of the week. The background color can be customized or replaced with pictures or photographs customized and selected or uploaded by the user. In this way, the user interface, system components, and applications installed on the vehicle will provide a customized look and feel that is defined by the user for the vehicle, and additional functionality will cooperate and function with the systems of the vehicle by providing the mapping to the API to each of the applications that are selected by the user.

In still another embodiment, the applications can function alongside system components without requiring the applications to interface directly with manufacturers systems the of the control interfaces. In this scenario, applications can function and be placed in the user interface of the custom configuration in the same locations set by the user.

Figure 4:
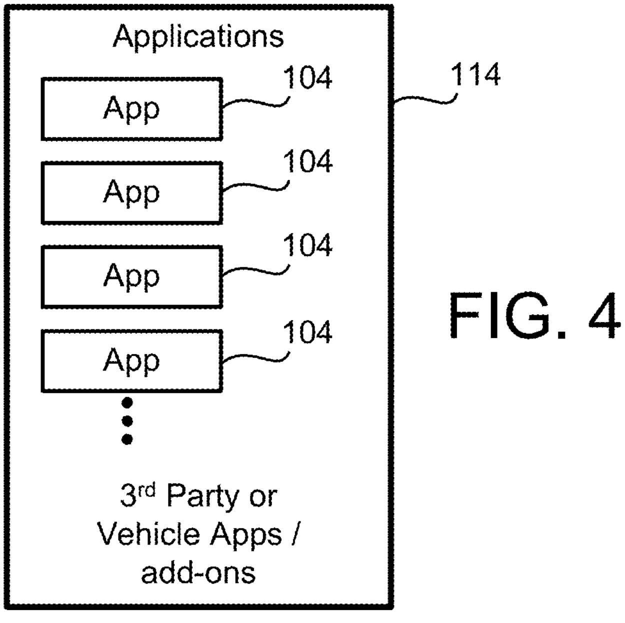
FIG. 4 illustrates an example of an array of applications that can be provided for use with the vehicle that a user is customizing to provide a customized configuration, for one embodiment.

FIG. 4 illustrates an example of an array of applications that can be provided for use with the vehicle that a user is customizing to provide a customized configuration. As illustrated, the applications 104 provided in a menu or listing 114 show particular applications that can be made accessible to the user for the selected vehicle that is being customized. In one embodiment, depending on the vehicle being customized, a different subset of applications will be provided to the user for selection. The subset of applications provided to the user will be those that are known to operate or interface with the selected system components of the selected vehicle.

In one embodiment, the custom configuration 200 will define a custom interface 202 that will be rendered on a display of a vehicle or on more than one display of vehicle. In one embodiment, the applications that are provided for selection in listing 114, may include third-party produced applications as well as applications produced by the vehicle manufacturer. Still further, the applications may be add-on applications that provide additional functionality to existing applications or existing system configurations. In still other embodiments, the applications can be defined as applets, plug-ins, widgets, code subsets, skins, code, or combinations of one or more thereof.

Figure 5:
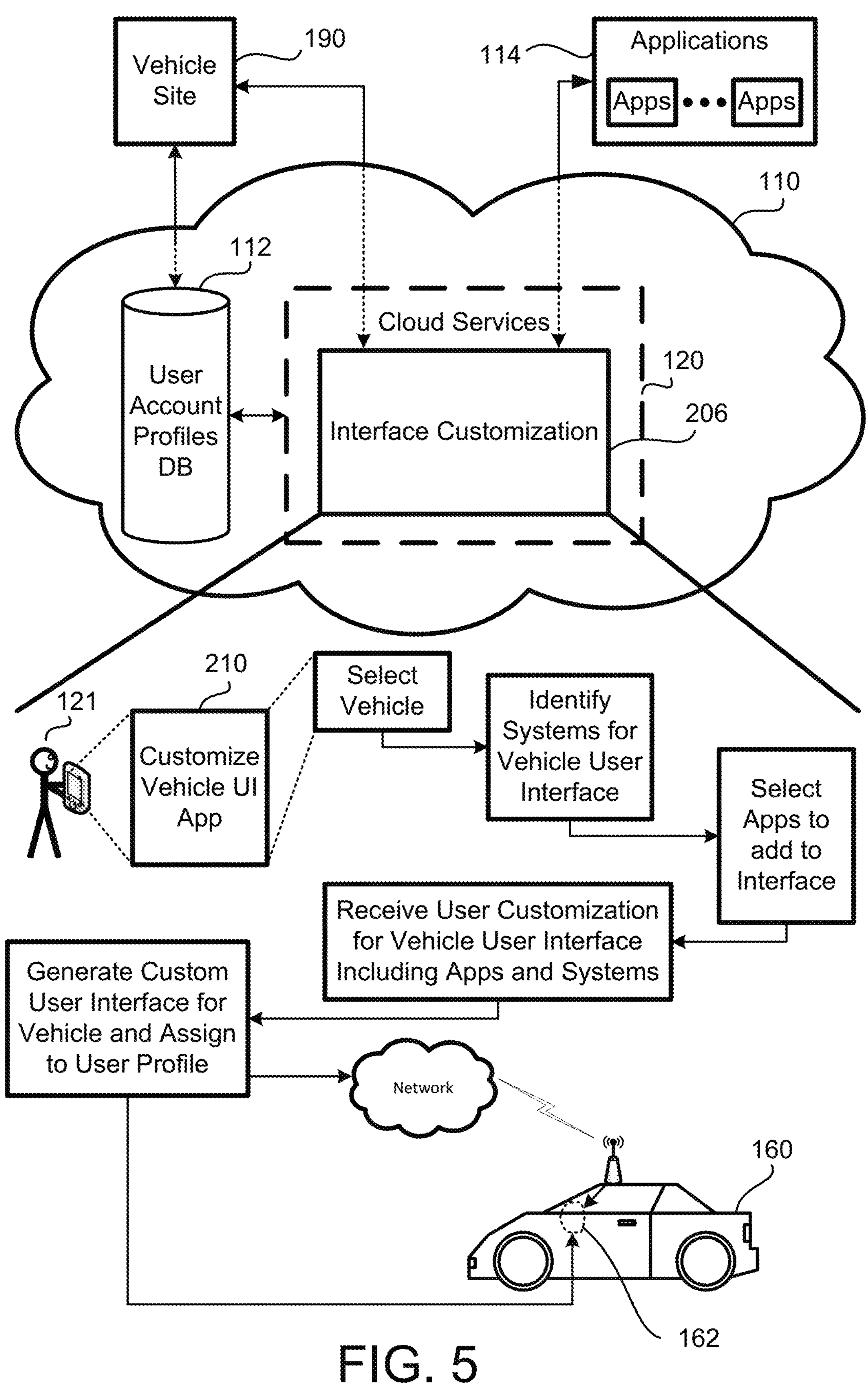
FIG. 5 illustrates a system and use diagram, of the configuration of the user interface, in accordance with one embodiments of the present invention.

FIG. 5 illustrates a system and use diagram, of the configuration of the user interface, in accordance with one embodiments of the present invention. As shown, applications 114 may be selected by a user that wishes to generate a custom configuration for a vehicle. In one embodiment, the user may go to a vehicle website 190 where the user may select a vehicle system component that matches the vehicle that the user wishes to customize. In one embodiment, the user would establish a user account in a cloud service of the vehicle manufacturer, or a third-party site that provides customization features for the vehicle manufacturer.

The cloud services 120 may provide interface customization 206 tools that will allow the user to select the application 114, select the system component for the vehicle, and arrange the selected applications, arrangement of the applications on the display screen, settings for the different applications, etc., to thus define a custom configuration for the user interface. The custom configuration will then be saved to a user profile database 112, which saves the custom configuration and provides access to the custom configuration for updates from time to time by the user, or for updates provided by the vehicle manufacturer.

In one specific example, a user 121 can visit a website, an app, or a portal to customize a vehicle display 210 using tools provided by a website that allows the customization. The tools can include pull-down menus, selection icons, text entries, radio buttons, arrangement and customization feature selectors, program settings, etc. The user can access the website using any user device. The user device can also include setting the custom configuration via a vehicle 160. In general, the configuration can be made using any device that has access to the Internet.

In operation 220, the user will select a vehicle using the tools provided by the website. Selecting the vehicle will allow the correct selection of the system component for that vehicle, and any other updates or parameters defined by the vehicle manufacturer. The systems for the vehicle user interface will then be identified in operation 222. A tool than be provided to allow selection of the apps to add to the interface in operation 224. As mentioned in this disclosure, the user can select any number of applications to add to the custom configuration. From time to time, the user can select additional applications to add to the custom configuration or removed from the custom configuration. In operation 226, the user customization for the user interface will be received including the defined applications and systems.

In operation 228, the custom configuration will then be generated and can be assigned to the user profile of a user account, in a database(s) of websites handling the cloud services 220. In some embodiments, the website may be hosted in a distributed manner, using virtualization and distributed data centers. The distributed data centers can then communicate data and process operation to the vehicle to execute the applications and system components, and provide resources from third-party applications and applications over the Internet.

The generated custom configuration can then be transferred to the vehicle 160 and operated using vehicle electronics 162. Vehicle electronics 162 can also include a display. As mentioned above, the display can be a single display or a plurality of displays. The displays are configured to generate images for various screens, selections, icons, buttons, controls, and received touch input and communicate text information and other data to users.

Figure 6:
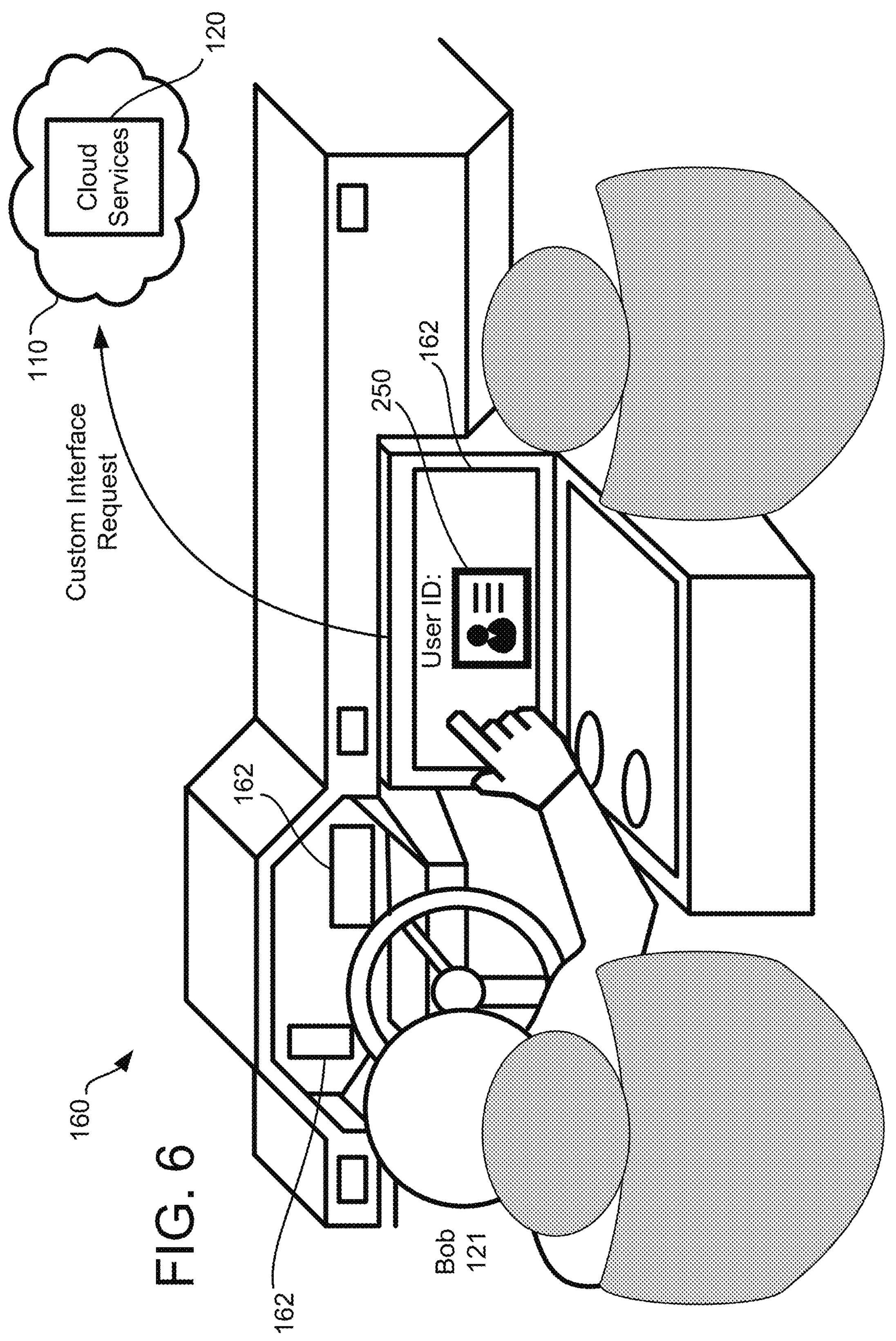
FIG. 6 illustrates an example of user interfacing with a display in the dashboard of vehicle, in one embodiment.

FIG. 6 illustrates an example of user 121 interfacing with a display 162 in the dashboard of vehicle 160. In this example, the display 162 will produce a user interface 250 that requests the user to input a user ID. The user ID can be any credentialing type input. The credentials can include usernames and passwords, keys, alphanumeric entries, biometric inputs, voice inputs, retina scan inputs, fingerprints, face recognition, etc. In FIG. 6, user 121 will enter the user ID which would then send a custom interface request to cloud services 120, over the Internet. As mentioned above, vehicle 160 is connected to the Internet, or is connected to the Internet at particular times. When the vehicle 160 is connected to the Internet, the request can be sent to cloud services 120, to request the custom configuration for the user.

A user having an account with cloud services 120 will have previously defined custom configurations that may be downloaded or accessed without download for the specific vehicle. The vehicle ID would be sent to the cloud services 120 by the vehicle upon sending the request for the custom configuration.

Figure 7:
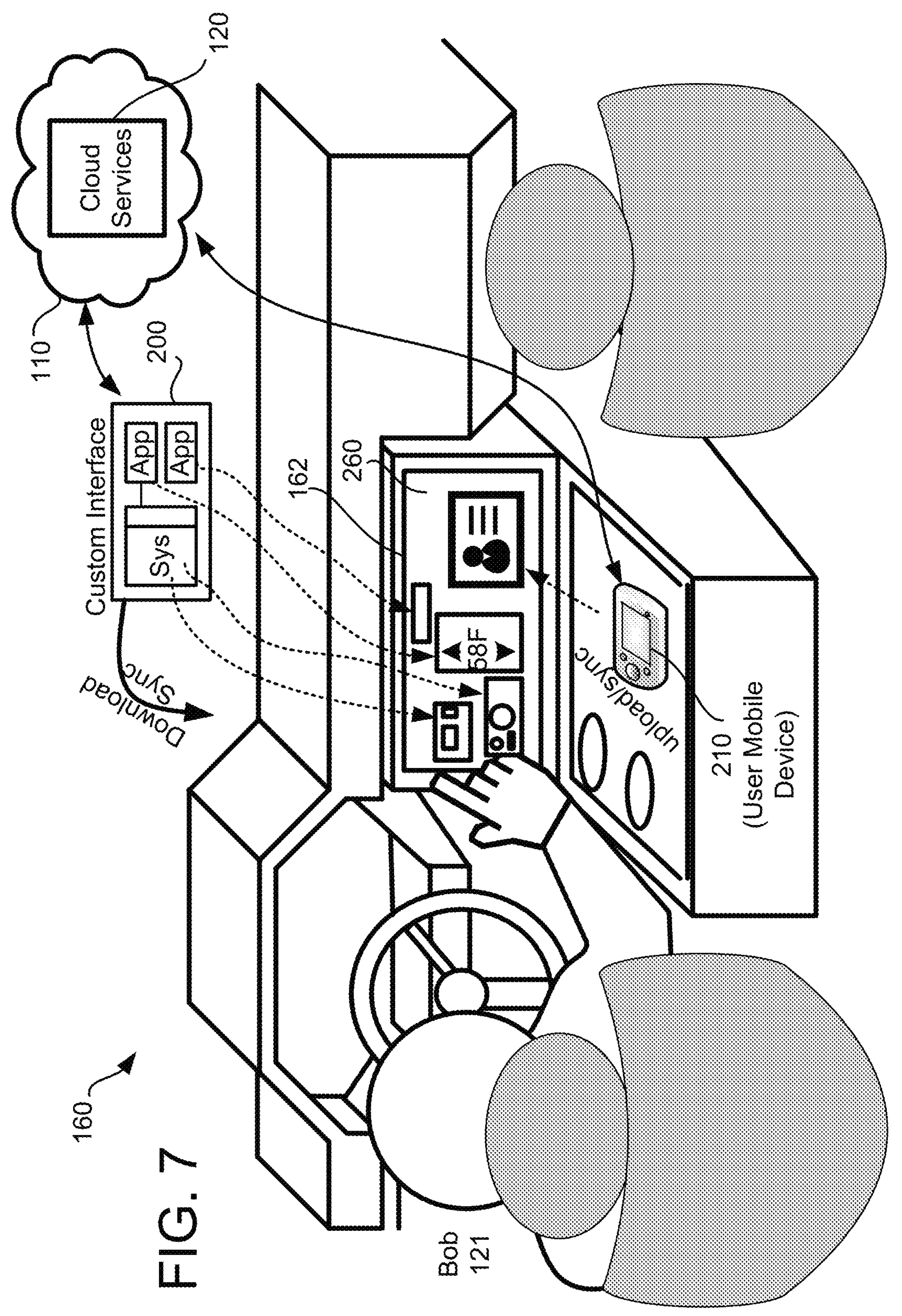
FIG. 7 illustrates how the custom configuration that provides the interface defined by the user, is downloaded to the vehicle electronics and the display of the vehicle in one embodiment.

FIG. 7 illustrates how the custom configuration 200 that provides the interface defined by the user, is downloaded to the vehicle electronics and the display 162 of the vehicle 160. The display 162, as noted above, is only an example display, and display can be of any size and can include multiple displays. For simplicity, a single display 162 is shown in FIG. 7.

In this example, the display 162 is populated with user interfaces for the system as well as the applications. As shown, app interfaces may be presented in specific locations in the user interface as well as system interfaces that are provided in other specific locations in the user interface. In one embodiment, the definition of where the specific user interfaces for the systems and the apps are to be defined, is set by the user during the configuration process.

In other embodiments, the positioning and layout or arrangement of the specific components of the user interface, whether they are system interfaces or app interfaces, may be custom arranged by the system over time based on use patterns. The use patterns of the user can be learned by the system so as to arrange the various system components and app components in various locations of the display 162. In other embodiments, certain interfaces will be surfaced (e.g., shown in prominent locations) on the display at certain times of day, certain times of the week, certain times of the month, certain times of the year, etc. Better placement of the app components and system components, and programming of data into the components can be optimized over time based on learning the input patterns provided by the user to user interface.

For example, if the user always views the weather in the mornings at 8 o'clock or 9 o'clock and a.m., then the weather icon or interface will automatically start to be surfaced on the display during those times. If the user plays rock 'n roll rock music on the weekends and classical music during the weekdays, this preference will also be learned. Learning of these preferences will act to custom define the layouts and placement of the icons and user interfaces on the display over time. In still other embodiments, the specific placement, location, and arrangement of the apps, system components, buttons, controls, etc., will be preset and fixed by the user based on predefined settings.

These predefined or learned settings can be saved to the database in cloud services and associated with the user account. Updates to the settings can then be made at any time by accessing cloud services over the Internet using any device, whether the devices are in the car, of the car, a portable device, a home computer, a work computer, a tablet, a smart phone, a smart watch computer, etc. Also shown in FIG. 7 is an embodiment where a user's smart phone or mobile device is synchronized with the user interface of the vehicle 160. In this embodiment, the user's portable device 210 can synchronize and upload content and UI controls from applications stored and running on the portable device 210. This provides for safer driving, as the controls shown on the vehicle display can be restricted based on driving or operation status.

In one embodiment, the user can custom configure to have content from applications running on the portable device 210 to be displayed in the vehicle displayed 162 in a specific location. This location on the display can then be synchronized or mirrored to that part of the display based on the configuration. In still other embodiments, the custom configuration can determine to synchronize an application running on the portal device to occupy the entire display 162. For example, if the user wishes to use his own telephone calling interface and contacts that are stored on the portable device 210, that information can be populated and mirrored to the display device 162, while still using other system components or other applications of the vehicle in the background or in a separate screen that is not currently active. In this example, the portable device 210 as well as the vehicle electronics can communicate with cloud services 120 at the same time, or when specific functions, data or communication is required.

Figure 8:
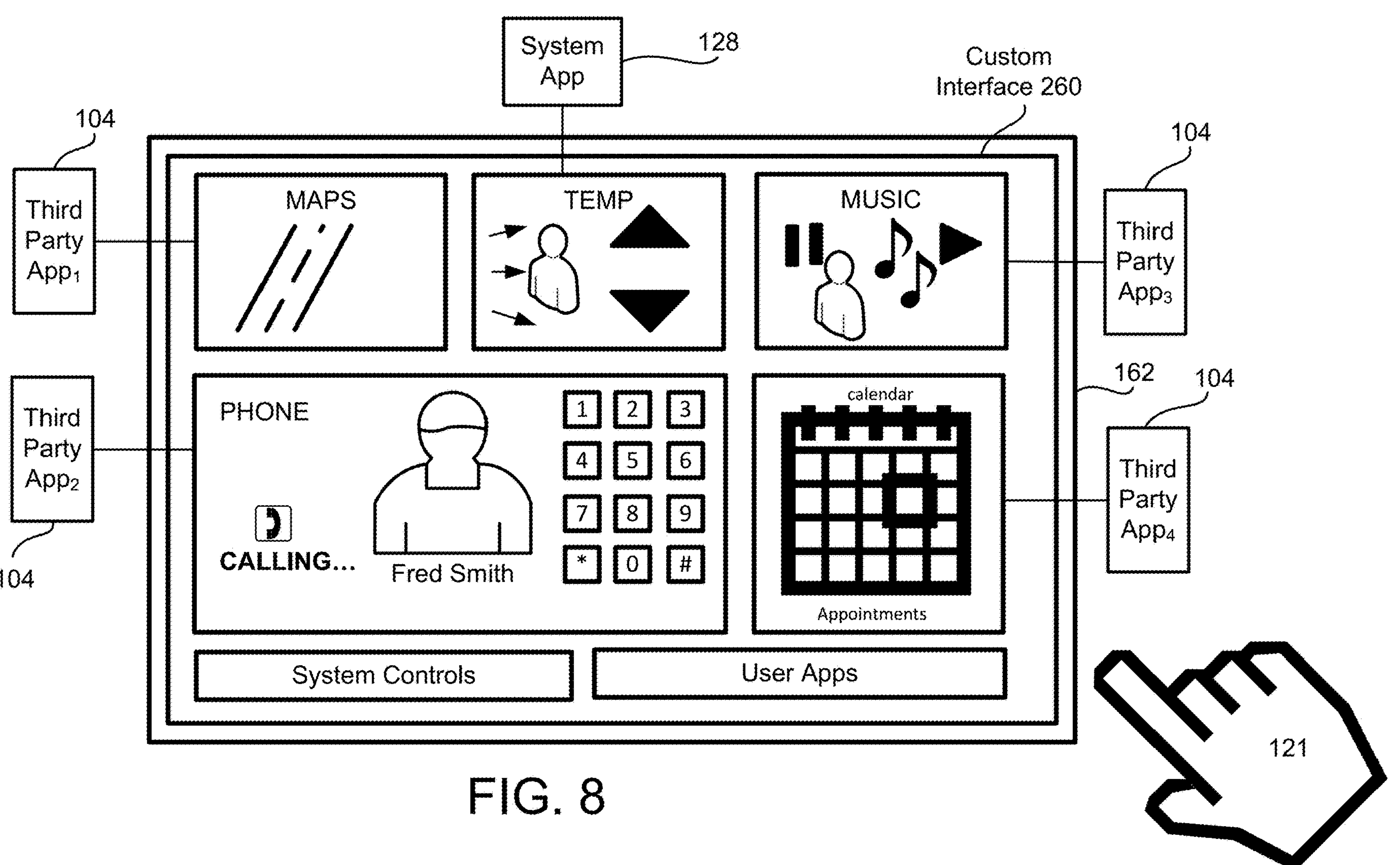
FIG. 8 illustrates an example where a display device of the vehicle will illustrate and render different applications or application components in user-defined locations, in one embodiment.

FIG. 8 illustrates an example where a display device 162 of the vehicle will illustrate and render different applications or application components in user-defined locations. In this example, different parts of the display contain different components or applications, which are custom designed or laid out by the user in the custom configuration. In one embodiment, the applications can be third-party applications, which are custom designed to operate with the system component of the vehicle. In this manner, the user can decide to get third-party apps 104 to replace certain applications provided by the system.

However, the user that defines the custom configuration can decide to maintain certain system component applications 128. The custom interface 260 may therefore include a hybrid of third-party applications and system applications, all designed to be laid out arranged and provide the look and feel/functionality desired by the user. In this illustration, a third-party app 104 is provided for a calendar. The calendar may be synchronized with a user's online calendar, which automatically populates the user's data to the vehicle user interface. The radio app may also be a third-party app, which may have radio stations that are a mix of land-based radio and Internet radio. Scores from time to time, the user can then arrange the location of the specific applications to different portions of the display.

Still further, certain applications can increase in size when being used or decrease in size to enable selection at a later time. For example, selecting the temperature system component may expand the system component to a larger space, thus temporarily removing other displayed components. The user can also select other buttons to access other system controls, other apps, or modify or add applications or system controls. When modifications are made, the modifications are saved to a user database and profile of the user, as managed by cloud services.

Cloud services will therefore allow any future modifications to be made to the custom configuration at any time and from any computer connected to the Internet. Still further, the custom configuration can be transferred to a second vehicle. If the custom configuration is transferred to a second vehicle, the system can select the system components for the second vehicle and attempted do a best match of applications available for the second vehicle that resemble or match the ones used in a first vehicle. Specific settings, arrangements and other features may also be transferred to a second vehicle, by simply transferring the custom configuration to a second vehicle.

Figure 9:
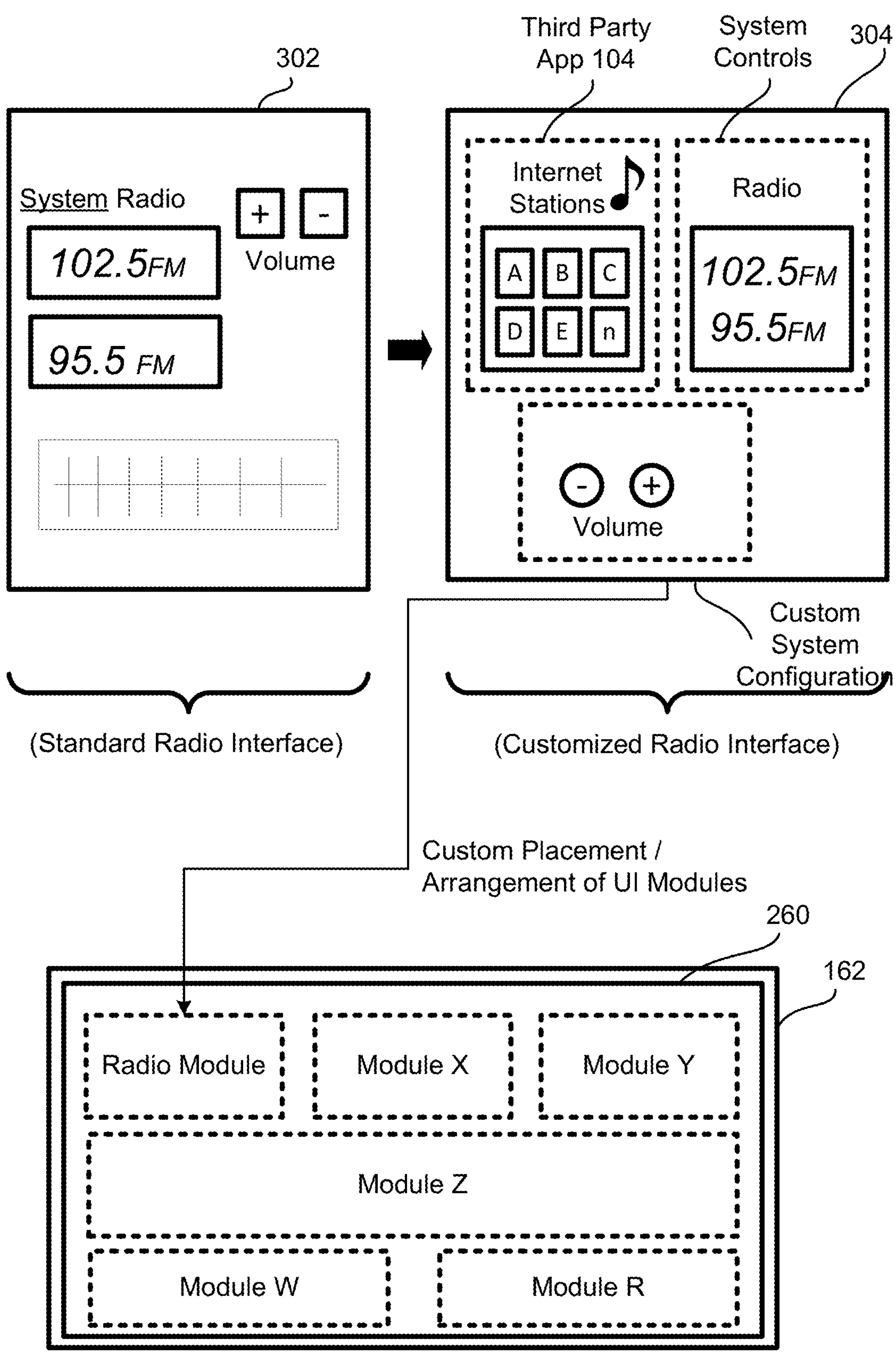
FIG. 9 illustrates an example of customization operations that can be performed, in accordance with one embodiment of the present invention.

FIG. 9 illustrates an example of customization operations that can be performed, in accordance with one embodiment of the present invention. In one example, a standard radio interface 302 is shown having standard radio functions, such as text controls icons and the like. If a user does not like the radio interface 302 provided by the manufacturer of the vehicle, the user may choose to replace the radio system 302 with a third-party application 104 that provides a customized radio interface. In one example, the application 104 can provide an interface 304, which has a number of sections or areas. These areas can be customized in one embodiment, or can be defined by the developer of the third-party application 104.

If the sections are customizable, the user can select certain portions of interface 304 to be provided by another third-party application 104. For example, interfaces can be used to customize the entire system component, such as the entire radio 302 interface, or the customize radio interface 304. The interface can be itself customized by adding sub applications or subcomponents of code that define smaller user interface sections for the custom system configuration of a radio.

Once specific modules have been customized, either by selecting pre-customized third-party applications, or by constructing a custom module, these modules can be arranged to define a custom placement or arrangement of user interface modules to be displayed on a vehicle display 162. The customized display 260 can therefore be defined by a plurality of modules, which may be provided or obtained by adding third-party applications to the custom interface design by the user, or by moving or arranging existing user interface components provided by the manufacturer to specific locations on a screen arrangement. Other customization features can include, adding custom backgrounds such as images, pictures, and other multimedia components to the display.

In one embodiment, the custom interface can include smaller icons/GUIs that identify specific applications that were added to the custom interface, that when selected expand to provide the functionality of the applications. The applications can be minimized or maximized on the screen. In one embodiment, the functions of the specific applications illustrated in the display 162 will be monitored and restricted depending on safety considerations while driving. For example, if the interfacing functionality requires more interactivity with the display, or requires a reading of text or inputting text, those functions will be disabled during operation of the vehicle. Once the vehicle comes to a stop, or is placed in Park, certain of these functions will be activated. In other embodiments, other safety considerations will allow for applications to shift from outputting text to outputting audio or voice. The input can also be changed from touch-screen, button touches, selections, and/or voice input. In still other embodiments, safety considerations can allow certain user interface components to move about the display to provide easier reading while driving or automatic conversion of text to audio.

For example, content being displayed in the center panel display of the vehicle, can be automatically shown in the dashboard display region of the vehicle, such as in front of the steering wheel. In still other embodiments, some content or display data can be moved from the center console or the display in front of the steering wheel to the windshield of the vehicle in a heads-up display area. Accordingly, algorithms executed by the applications and applications of the manufacturer, can cooperate to provide functionality to the application features and interfaces, while maintaining safety parameters defined by rules. The safety parameters will therefore allow content of the user interface to be shifted around to various displays of the vehicle, or translated to voice or audio at certain points in time.

Figure 10:
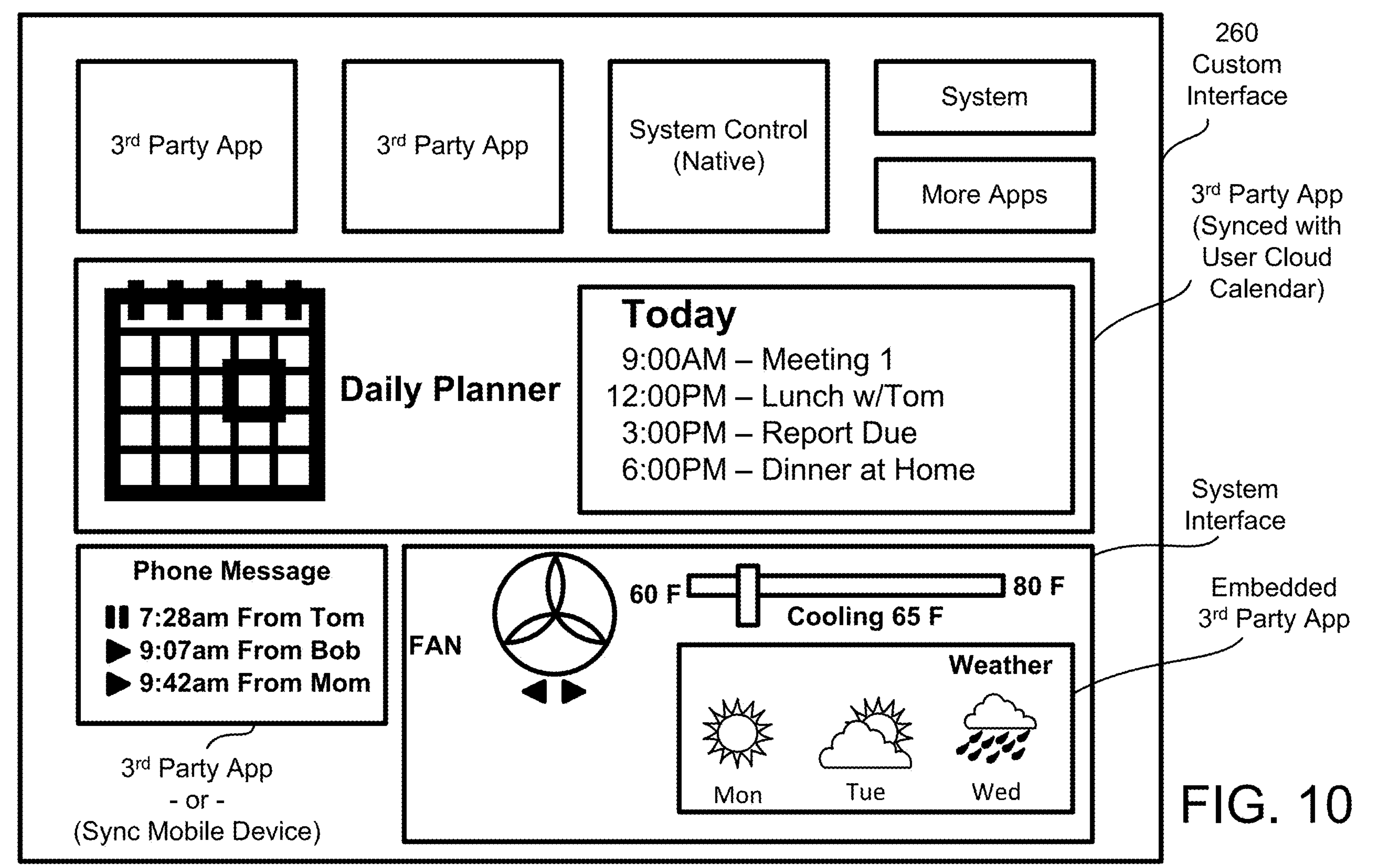
FIG. 10 illustrates an example of a custom interface, in accordance with one embodiment of the present invention.

FIG. 10 illustrates an example of a custom interface 260, in accordance with one embodiment of the present invention. As shown, the custom interface 260 includes various components or modules. The various components and modules can be arranged or defined by suggested arrangements during the customization by the user. As mentioned above, the customization by the user can be facilitated by allowing access to tools and website applications that allow selection, arrangement, dragging, color definition, size definition, positioning definition, and other custom controls. The custom controls can also be used to define settings for the various components. The settings can include programming and custom alarms, settings of when particular types of music should be played, radio station selection, pre-turn on of the vehicle at certain times to provide heat to the vehicle or cool the vehicle in advance, and other remote access, monitoring, image detection, security features, and associated settings.

These settings and customizations can be made through the web/cloud services and tools provided by the website of, for example the manufacturer of the vehicle. In one embodiment, the cloud services provided by the manufacturer can be provided by a partner of the manufacturer. The partners of the manufacturer can include software companies that develop, host, or manage certain functionality provided by the vehicle manufacturer. In other embodiments, the partner software companies can integrate tools or components with tools and components of the vehicle manufacturer. This provides for integration with one or more cloud services, software services, Internet services, and services provided by systems of vehicles or systems of the vehicle manufacture. In either case, whether the software and logic is designed and constructed by one or more entities, the cloud services provided by the vehicle manufacturer or the website that provides the tools for customization will appear as a unified simple to use interface for the user. As mentioned above, the cloud services can provide databases for saving the user profile and data associated with the user account.

The user profile can include settings made by the user, customizations made by the user, identification of applications purchased or added to the vehicle customizations, etc. Still further, the user profile data can be part or be associated with the user account. In this manner, the user that customized a user interface can access the Internet at any time, whether through the vehicle or through any other computing device having access to the Internet and make changes, modifications, or access control features of the vehicle remotely. In one embodiment, the profile of the user can be accessed from any vehicle, such as rented vehicles or shared vehicles. Settings and profile data can then be shared for a period of time on any vehicle and use data on that vehicle can be stored.

Continuing with the example of FIG. 10, it is shown that several of the components of the custom interface 260 can include applications from 3rd parties, or applications and controls provided by the vehicle manufacturer. In one embodiment, an application provided by third-party, such as an online calendar, can be synchronized with the user's calendar managed by a 3rd party or stored by a 3rd party on a website. For example, if the user uses a cloud service to store his or her calendar, the calendar appointments can also be displayed on the vehicle interface, and are synchronized to the user's global calendar settings that are accessible through any computing device. In one embodiment, the daily planner can include data or information for the user, such as reminders to purchase or get certain things. If while the user is driving around those certain things can be purchased or obtained from local merchants, the user can be provided with notifications of availability of those particular things or goods the user desires to purchase.

In still other embodiments, advertisers can provide data to the user that is relevant to the user, such as discounts for the goods or services the user wishes to purchase. In still another embodiment, an application can be provide for the vehicle that provides a user the ability to set and to find certain things, such as goods and services the user needs. As the user drives around, and algorithm determines whether certain goods or services are available in the proximity of the vehicle's driving actions. If the vehicle approaches or is near certain goods and services, and such goods and services are advertised to have a discount or availability, the user can be notified on the user display, or by audio output by the vehicle. This functionality can be enabled or disabled on demand, as programmed by the user in the application that's added to the user interface.

Still in FIG. 10, it is shown that other applications can be embedded into other applications. For example, the standard system interface for the temperature control and fan of the vehicle can be customized to add additional features. For example, in addition to the controls for the standard vehicle settings, the user can also be provided with controls to access or add additional applications. These additional applications can be embedded or overlaid on other applications. In one example, and embedded application can allow user to embed a weather application, which is synchronized to an Internet service. In other embodiments, other applications such as phone messages, notes and the like, can be synchronized with an Internet application or with a local device.

The local device might be the user's mobile phone, the user's computer wristwatch, the user tablet computer, the user's laptop computer, or the mobile device of a person inside the vehicle. In one embodiment, data from the local devices can be synchronized locally to the display of the vehicle in selected regions. These selected regions of the display can be defined by the user during customization, or can be defined automatically by the system based on sizing areas on the display, relative to other applications or features displayed on the one or more displays of the vehicle.

Figure 11:
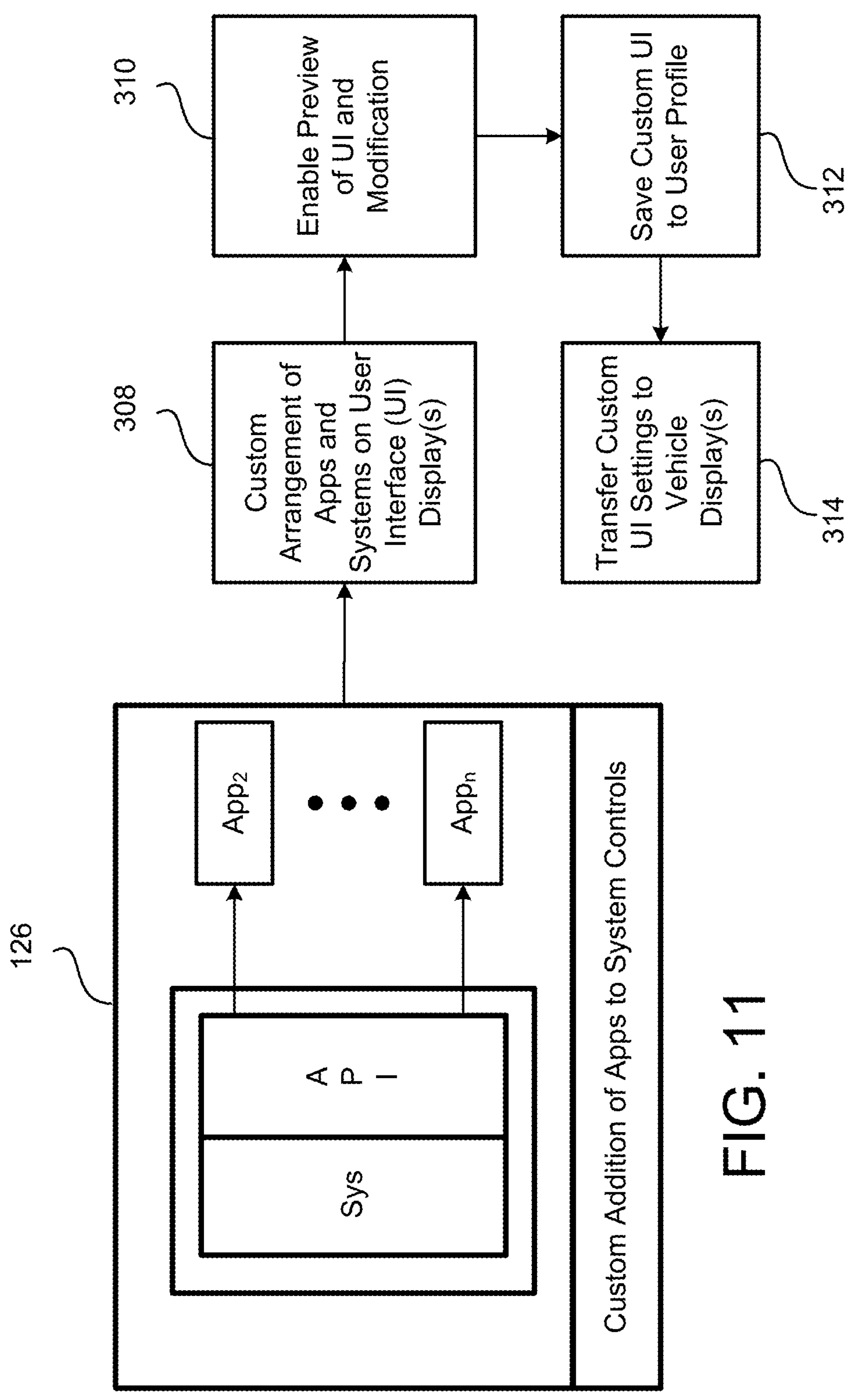
FIG. 11 illustrates an example of a system component with its APIs, and interface with a plurality of applications selected by the user, in accordance with one embodiment.

FIG. 11 illustrates an example of a system component with its APIs, and interface with a plurality of applications 126 selected by the user. The user can select add or delete applications from time to time to define custom addition of apps to the system, or to replace system controls. Once the user has selected the certain applications, a custom arrangement of the apps and systems on the user interface display can be enabled. As mentioned above, the customer arrangement, definition, placement 308 of certain components or applications on a display can be customized by the user.

Also noted is that the system can automatically arrange or move certain applications or components on the display depending on size constraints, or other features that are synchronized with system settings. In operation 310, the user can be provided with tools to enable preview of the user interface and allow for modifications from time to time. The customization can then be saved to the user profile or user account in operation 312. In operation 314, the custom configuration can then be transferred to the UI settings of the vehicle to allow for display, in accordance with the arrangement configuration, selection of applications configuration, and rules enforced by the vehicle manufacturer to enable safety and use of the applications and features.

Figure 12:
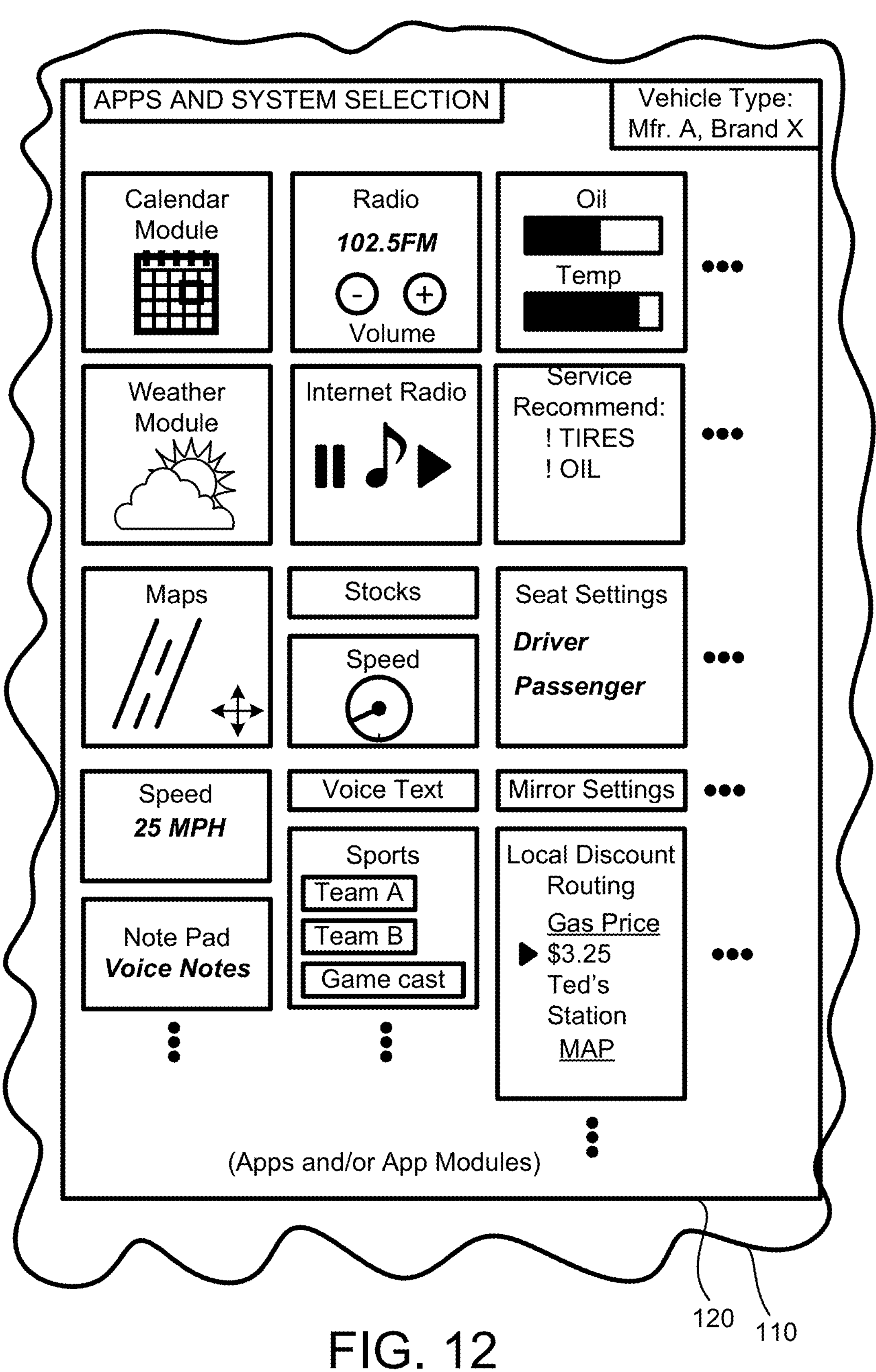
FIG. 12 illustrates an example of apps and system selections features, in accordance with one embodiment of the present invention.
Figure 13A:
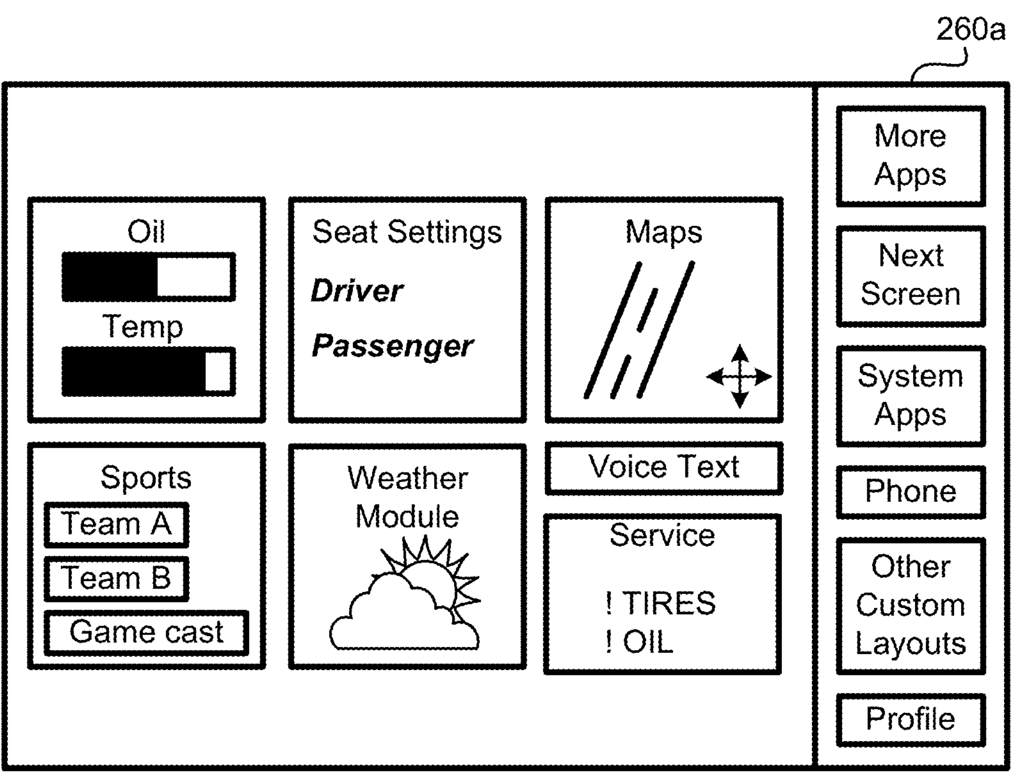
FIGS. 13A-13D illustrate examples of different user interfaces that can be defined by the user, in some embodiments.
Figure 13B:
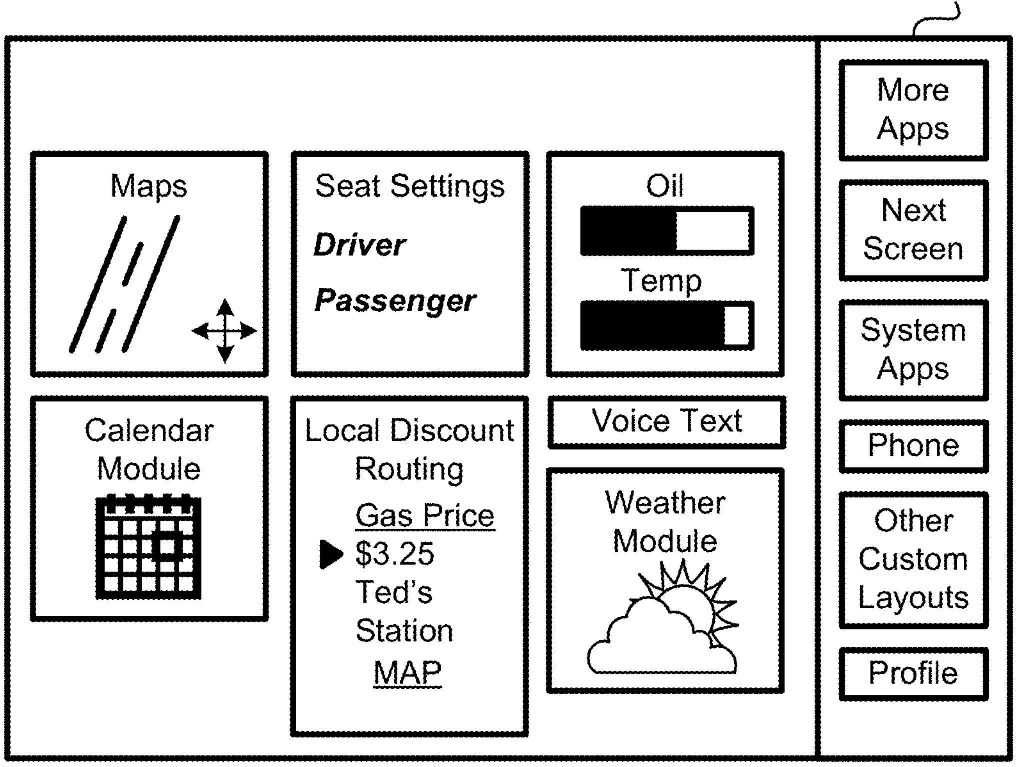
Figures 13C, 13D:
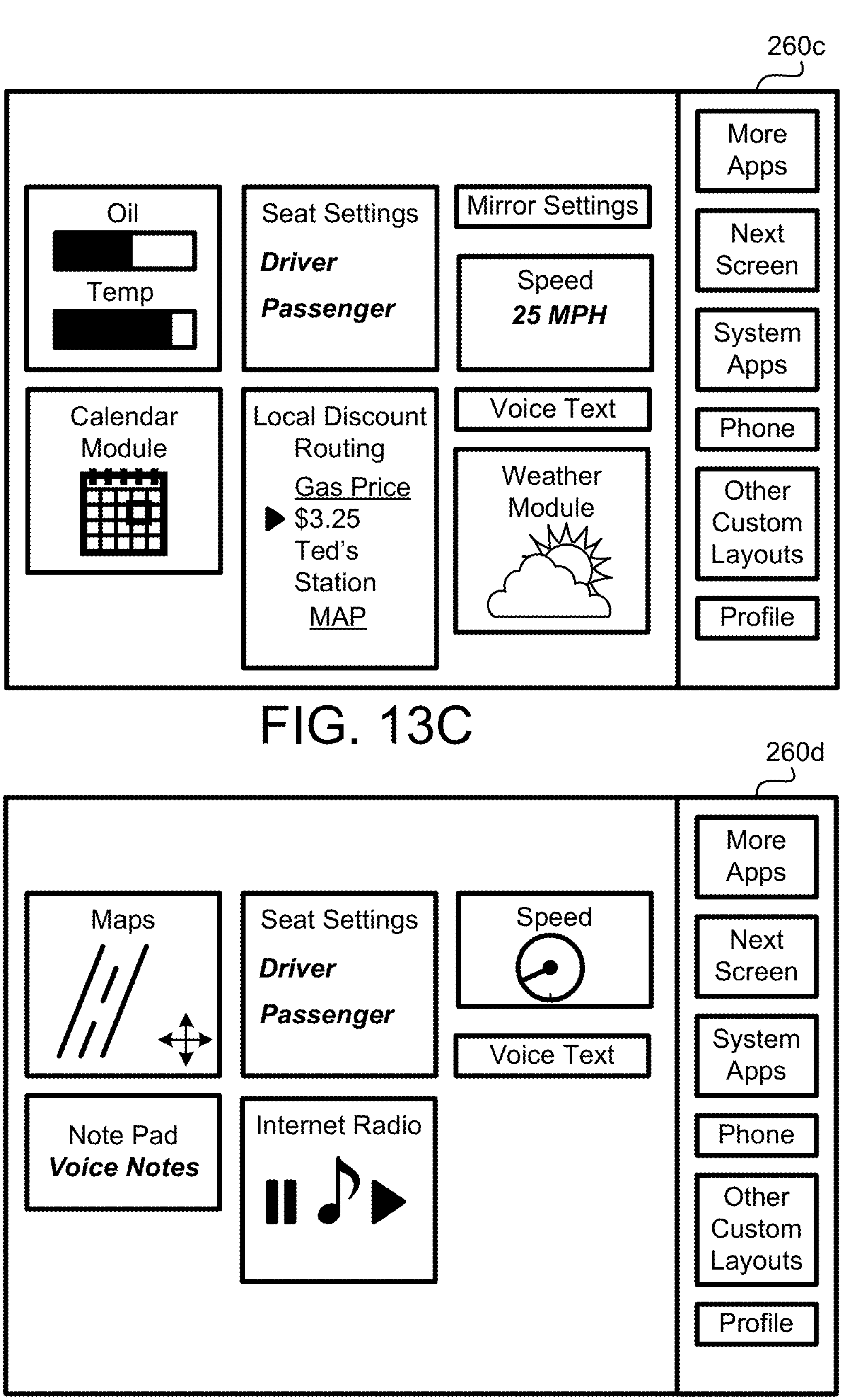

FIG. 12 illustrates an example of apps and system selections features 210, in accordance with one embodiment of the present invention. In one example, the user can be provided with a number of applications to select when accessing cloud services over the Internet 110, for addition to a custom configuration. In one embodiment, once the user has selected the vehicle type, manufacturer and brand of the vehicle, the user is provided with an automatic listing of certain applications that are available for that vehicle for customization. In this illustrative example, which is not exhaustive of all possible types of user interfaces and selection menus and presentation types, the user can be provided with icons that illustrate example user interface that can example apps that may be added to the vehicle or vehicle customization. As noted above, the customization can be provided with apps, as well as widgets, or code that can be added to the display. The apps and code can be provided by 3rd parties or the manufacturer of the vehicle, or both.

FIGS. 13A-13D illustrate examples of different user interfaces that can be defined by the user. Again, these different configurations and arrangements are provided simply as an example. Additionally, although only one display being shown, the configuration can be made for multiple displays in a single vehicle. Most commonly, the display is one that can be located in the center console of a vehicle. However, often the display can also be incorporated as the main display in the dashboard, which shows and illustrates common dashboard system readings and data. These can include, for example, the speed of the vehicle, the RPMs of the vehicle, the fuel level of the vehicle, the temperature of the vehicle, the battery life of the vehicle, the battery and range of an electric vehicle (EV), and related data. Thus, the customization can be for any display in the vehicle, including displays in passenger areas of vehicle.

As shown in FIGS. 13A-13D, various ones of applications can be located in different locations of a display screen. Although the display and features of the display are described as being applications, the icons can represent access to the applications and the icons can expand to encompass the entire screen or part of the screen at various times of use. In one embodiment, the user can customize the display directly from the display, by selecting more apps, can view different screens by selecting a next screen, can access system applications, can access the phone, can provide for other customizations and layouts, and can update the profile. As noted earlier, the custom configuration can be set for a particular user.

When the user is not using the vehicle, the custom configuration can be turned off or locked out for another session. Once the user wants to start a new session, the user can log back in and the custom configuration returns. In other embodiments, the custom configuration will automatically turn off when the user is not driving the vehicle or has not logged into the vehicle. In other embodiments, the custom configuration can be automatically turned on when the user is detected. The user can be detected using biometrics, login credentials, image detection of the face, fingerprint detection, retina scans, etc. Still further, the custom configuration can be transferred to other vehicles.

If the user wishes to use his or her custom configuration in another vehicle, the user can login to the custom configuration or user account from another vehicle. If the other vehicle does not have all the system components needed to define the custom configuration, the custom configuration can be supplemented with other similar components automatically. In other embodiments, the custom configuration can be transferred from one vehicle to another, or when the user buys a new vehicle. In another embodiment, the custom configuration can be adjusted based on the driver. The custom configuration can also be preset remotely from the Internet, using the cloud services. The custom configuration can also be configured to provide limited use of certain systems or the vehicle, such as when a guest is driving the vehicle. In other embodiments, restrictions can be placed on the vehicle speed, location of driving, and automatic notifications for the user or the master user of the vehicle. The master user of the vehicle can have a master account with administrator credentials.

In still another embodiment, the vehicle can be loaned to a child of driving age (under 21/18 years of age), and the child can be provided with restricted use of the vehicle. When the child exceeds or does not follow the restrictions of the vehicle, automatic notifications can be provided to the user that is the administrator of the vehicle. The notifications can be by cell phone, smartphone, tablet computer, mobile device, text messages, phone calls, commendations of phone calls and text, audio messages, audible sounds, vibrations, and commendations thereof. History use of the vehicle can also be maintained in cloud services. The history use can provide the user with information as to where the vehicle has been, the speed or events, violations that occurred when use of the vehicle etc. The configuration can also provide messages to the driver warning the driver of when the vehicle has exceeded a restriction, or is approaching a restriction in use, driving area, speed, etc.

Figure 14:
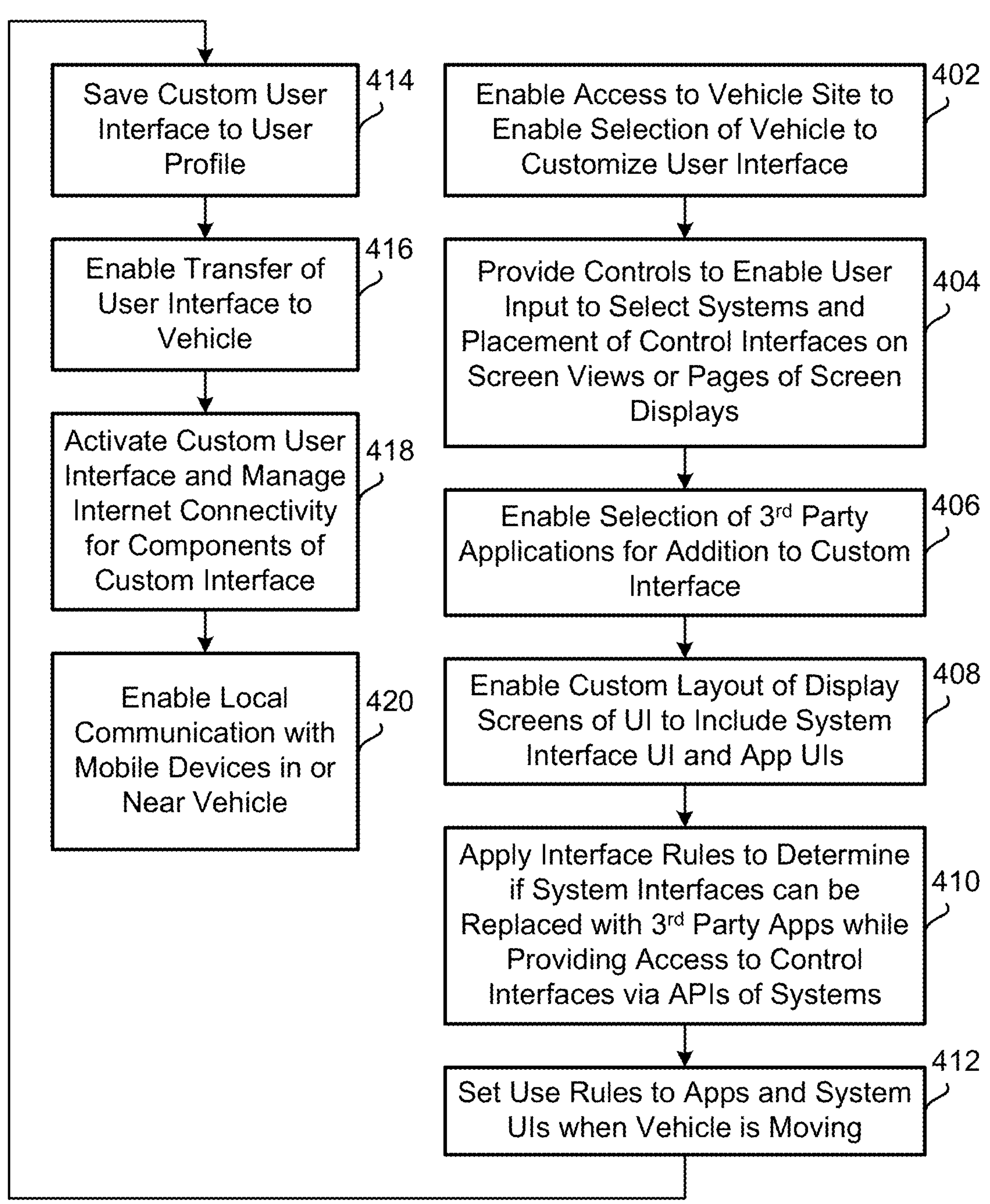
FIG. 14 illustrates example flowchart, of operations performed to generate a customized user interface for vehicle, in accordance with one embodiment of the present invention.

FIG. 14 illustrates example flowchart, of operations performed to generate a customized user interface for vehicle, in accordance with one embodiment of the present invention. In one embodiment, the method begins by enabling access 402 to a vehicle site to enable selection of vehicles to customize for user interface. The access to the vehicle site, may be granted by supplying credentials for accessing a user account, or establishing a new user account. The vehicle sites may, in one embodiment, include cloud processing to enable access to features provided by the website including features provided by other services and software accessible over the Internet.

In operation 404, the method provides controls to enable user input to select systems and placement of control interfaces on-screen views or pages of screen displays. The screen displays can have various configurations, placements, sizes, number of pages, tabs, etc., and the user can provide controls for some or all of the interfaces and controls in certain locations. In operation 406, selection can be enabled for third-party applications. The third-party applications can be selected from the vehicle site, or by providing links to third-party sites. The third-party applications can be pre-identified by the site and displayed to the user if they are compatible with the particular vehicle selected. In another embodiment, the third-party applications can all be shown to the user whether or not they are compatible with the vehicle. Upon binding/pairing or attempting to find application for the vehicle, compliance as to whether the applications operate or comply with the particular vehicle can be made.

As mentioned in this disclosure, certain third-party applications can be reviewed by the vehicle site administrators before they are made available to users for selection. In other embodiments, the third-party applications can be approved or disapproved. In still other embodiments, the third-party applications can be augmented with restrictions made by the vehicle manufacturer, or dictated by law. The restrictions can be applied, based on the anticipated interfacing with the vehicle interfaces, to ensure safety during driving. For instance, if a particular application requires entry of text, navigation of controls, or other activities that would distract the driver during operation of the vehicle, such vehicle controls or application controls for application interfaces can be temporarily disabled. In some embodiments, when the vehicle has come to a stop or is place to park, certain controls or interfaces can be re-enabled. In operation 408, the tools provided by the vehicle site or third-party site can provide for customization of the layout of the display screens of the user interface.

The customization can include organizing or laying out system interfaces as well as application interfaces, such as those interfaces provided by 3rd parties. In operation 410, interface rules are applied to determine if the system interfaces can be replaced with third-party application interfaces, while providing access to the control interfaces via the APIs of the systems. For example, if the user wants to provide a custom speed indicator, the speed indicator must be compliant (via APIs and/or mapping) with the system interfaces so that the speed readings can be populated to the third-party application. In operation 412, rules can be integrated with or applied to the applications and system user interfaces for when the vehicle is moving. As mentioned above, such rules can limit interactivity with certain user interfaces while the vehicle is moving to prevent unsafe driving. In operation 414, the custom user interface is saved to the user profile.

The user profile may contain settings, such as selections of the user interface components associated with the system of the vehicle, as well as user interface is provided by third-party applications. In addition, the user profile can contain and store settings provided by the user. The settings provided by the user, as mentioned is this disclosure can also be learned settings based on use. The settings can further include remote access settings, as well as settings allow the user to control vehicle components from a remote location or a remote computer. The setting can also include providing access to the user account to view historical driving patterns, recent driving activities, the performance of the vehicle during specific driving sessions, the performance of specific vehicle components, etc.

In operation 416, the custom user interface configuration can then be transferred to the vehicle. The custom configuration, as mentioned above is stored in the database of the vehicle manufacturer, or a database held by a 3rd party that cooperates with the vehicle manufacturer to provide cloud services. The database, in one embodiment, is a network accessible storage which allows access to the user to program and modify the user interface using any computer or device having access to the Internet, including the vehicle itself or a third-party vehicle. The method then proceeds to operation 418 where the custom user interface can be activated in managed for Internet connectivity for components of the custom interface. For example, the vehicle's Internet access protocols can be set, or registered with an Internet provider or service provider for the cloud services. The service provider for the cloud services can be the vehicle manufacturer, a company cooperating with the vehicle manufacturer, a third-party company, or combinations thereof.

In operation 420, the method can also enable local communication with mobile devices that may be in the vehicle. The enablement may be provided by allowing synchronization with the computing system of the vehicle, or with the computing communications of the portable device. For example, the local communication can be paired automatically, based on a preset pairing process where pairing keys are entered. This provides for automatic settings and synchronization when the user enters the vehicle with the portal device. As mentioned above, user interfaces associated with applications loaded on the user's portal device can also synchronize to the display screens of the vehicle, as predefined by the user.

Figure 15:
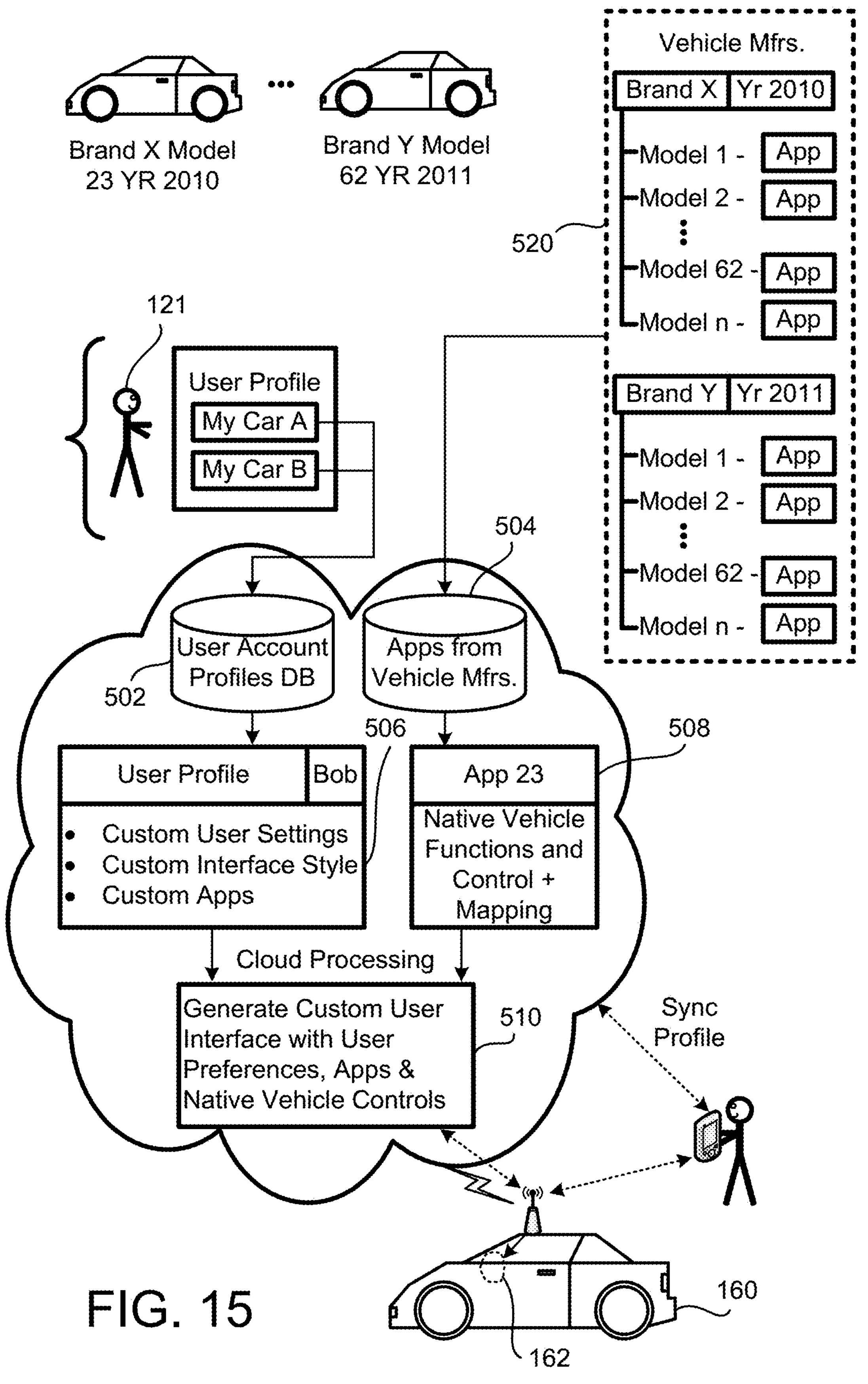
FIG. 15 illustrates another example, where a user uses a portable device to access the user profile, for one embodiment.

FIG. 15 illustrates another example, where a user 121 uses a portable device to access the user profile. The user profile, as mentioned above, can be managed by the cloud processing 120. The cloud processing may include a user profile database 502 (and other databases not shown) that allows the user to synchronize settings for various profiles, such as for "my car A", and "my car B", or the like. In one embodiment, the custom configuration can be transferred from vehicle to vehicle and for a period of time. The period of time can be a driving session. The driving session can be for a trip, a day, a week, a rental period, a lease period, etc. If the new vehicle receiving the profile has different system components, a re-mapping of system components to applications can be made. In some embodiments, alternate applications can be plugged in for the new vehicle which provide functionality similar to the application in the earlier vehicle.

Accordingly, the disclosed methods may allow users to add various vehicles to the user profile, including cars from different brands 520, such as Brand X and brand Y. In the illustrated example, the user profile for the user 121 may include custom user settings, custom interface styles, custom applications, and other custom settings and learned settings as described in this disclosure.

The users also able to select various applications from an application database 504, which may provide a plurality of applications from vehicle manufacturers, and the user can select applications for the vehicle types selected. In one embodiment, certain applications can include native vehicle functions as well as control and mapping protocols to allow the applications to interface with native system controls through appropriate map APIs. In operation 510, the custom user interface can be generated using cloud processing with the preferences set by the user, the applications, the native vehicle controls, and the customer arrangements. The profile that was generated can then be synchronized to the vehicle, such as car A.

The synchronization may include downloading of the customized interface from cloud services to the vehicle. In other embodiments, part or all of the customization created on the portable device or other computer can be transferred to the vehicle directly, without requiring transfer from cloud processing. In other embodiments, the synchronization or transfers can include operations performed by portable devices local to the vehicle, computing devices on the vehicle, computing devices of cloud processing, or combinations thereof.

Figure 16:
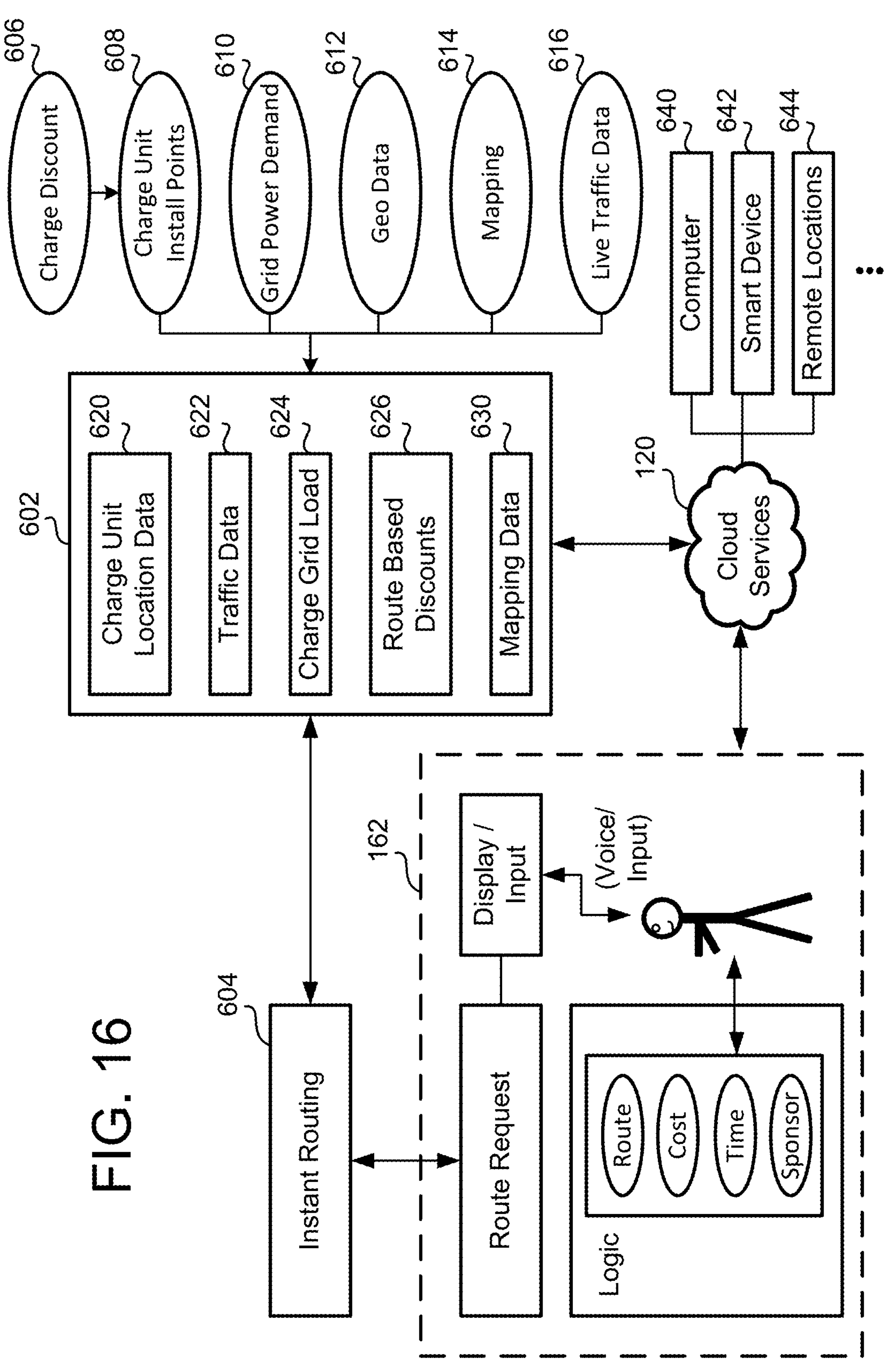
FIG. 16 illustrates an example of synchronizing other applications to a vehicle display, which may be customized by the user, for one embodiment.

FIG. 16 illustrates an example of synchronizing other applications to a vehicle display, which may be customized by the user. As shown, 602 shows a number of data collection and data interface modules, that can interface with third-party applications or applications executed on the Internet by cloud services or third-party cloud services. As shown, in the case of an electric vehicle, data associated with charge unit location data 620 can be collected from charge unit install points 608. The charger unit install points can also be providing charging discounts 606, which can then be transferred to data manager 602. Traffic data 222 can also be collected, whether the vehicle is electric or nonelectric.

Charge grid load 624 data can also be collected, for example for electric vehicle data. Charge grid load 624 can obtain data from a grid power demand source 610, which can include power company's local utilities and the like. Route based discounts 626 can also be provided to the user, by collecting mapping data 614 as well as discounts provided by goods and services providers in the marketplace. Mapping data 630 can also be managed, to monitor the location of the vehicle in relation to goods and services that may be provided when the vehicle is in proximity In some embodiments, discount data, advertisements, sales, goods and services offers, etc., can be provided to the user automatically based on the vehicle's location.

In other embodiments, the user can provide settings in the user interface that identifies which type of offers or discounts or information the user wishes to receive. In some embodiments, alerts regarding offers and discounts can be provided to the user in an audio manner, to avoid driving distractions. Live traffic data 616 can also be provided to the data manager 602, as well as geo-data 612. The data manager 602 is in communication with cloud services 120, to provide these services to computer 640, smart devices 642, remote location 644, and a display of the vehicle 162.

The display the vehicle can be interfaced with logic that runs on vehicle electronics. The vehicle of products can include memory and processors that execute instructions, operating systems, API processing, application management, telecommunications, network accessing, local communication with wireless devices, and general communication with the Internet. Route request can also be provided at the demand of the user via the display 162, and instant routing 604 can provide routes to the user based on data collected and managed by data manager 602.

Figure 17:
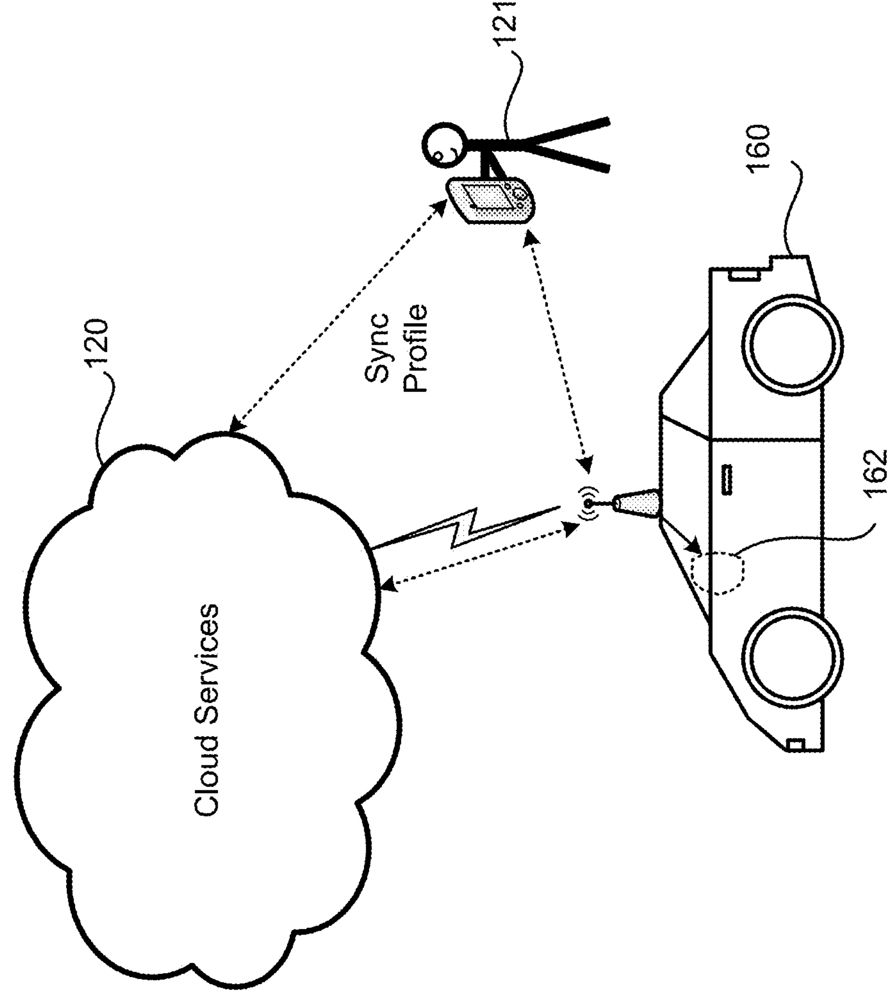
FIG. 17 illustrates example where the user holding a portable device can synchronize data from the portable device directly with the display of the vehicle, in one embodiment.

FIG. 17 illustrates example where the user 121 holding a portable device can synchronize data from the portable device directly with the display 162 of the vehicle. The display the vehicle can be a display on the dash of the vehicle, or any other location as mentioned in this disclosure. As mentioned herein, the vehicle electronics will be provided with communication with cloud services 120 provide access to the customize displays, customize settings, and customized services provided to the user as a vehicle drives.

Figure 18:
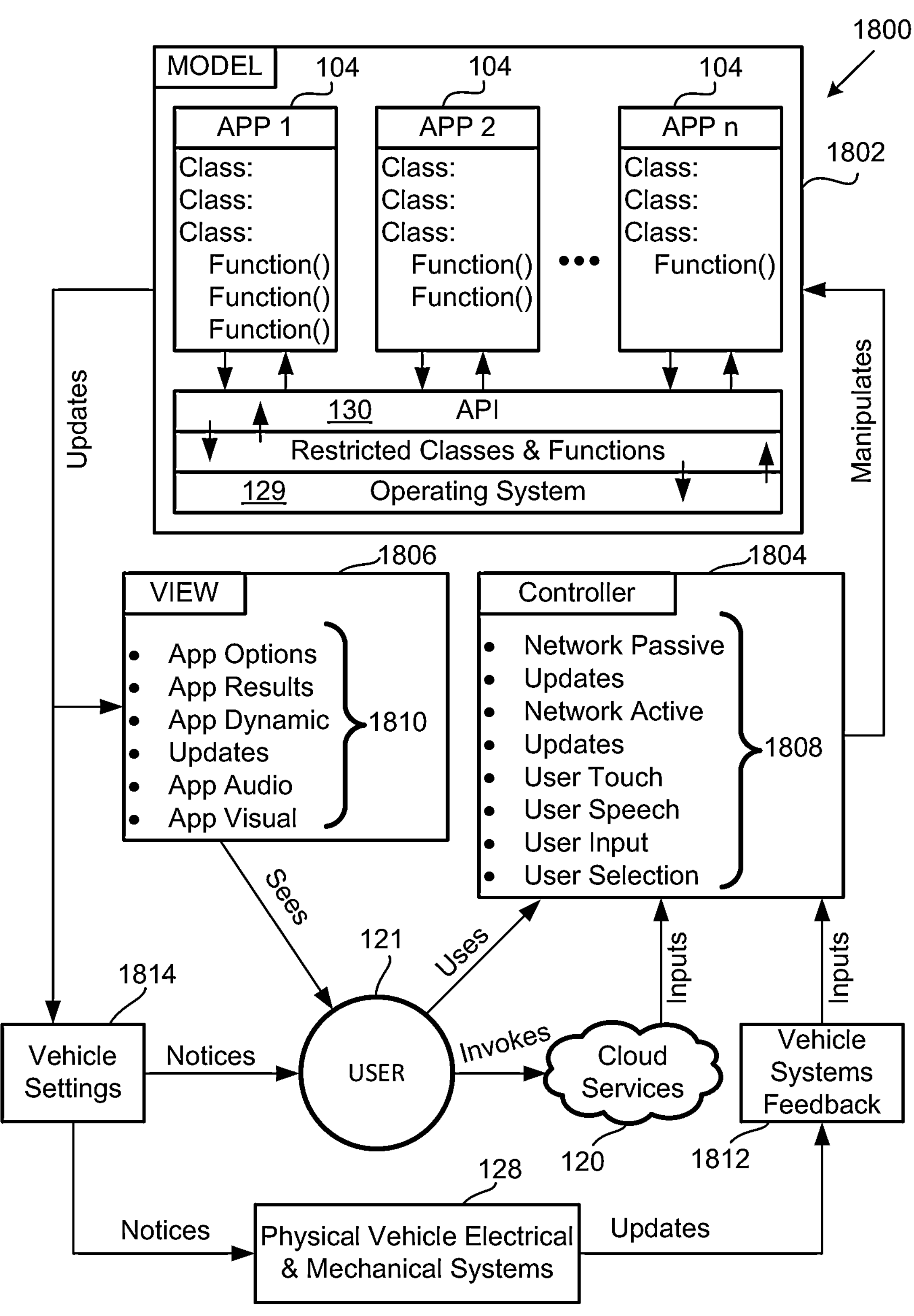
FIG. 18 describes a system in which a user interacts with a model view controller software environment useful for processing APPS using APIs on vehicles with vehicle operating systems capable of processing computer code, in accordance with one embodiment.

FIG. 18 describes a system in which a user interacts with a model view controller software environment 1800 useful for processing APPS using APIs 130 on vehicles with vehicle operating systems 129 capable of processing computer code. The model view controller paradigm 1800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 1812 used by a controller 1804 that may constantly poll electrical, capacitive and physical sensors, and input streams to detect if interactions 1808 such as network passive updates, network active updates, user touch, user speech, user input, user selection among others has been triggered.

Each input 1804 will then trigger manipulation of the system's model 1802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, audio or visual graphical user interface changes 1810 on any of the user's connected display devices. The user will notice these results visually or audibly but may also feel or detect changes in the vehicle's mechanical systems. Updates from the model 1802 may also be used to toggle vehicle settings 1814 which in turn may invoke changes in the vehicle's physical, mechanical and electrical systems 128.

Finally, the system controller 1804 may receive additional updates from the vehicle systems affected or additional user 121, cloud services 120, vehicle systems feedback inputs 1812 to re-engage the user in a cyclical fashion. If no inputs are sensed, the system's controller will continue to poll its electrical and data I/O systems for input on a continuous basis.

The model view controller paradigm 1800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 19A:
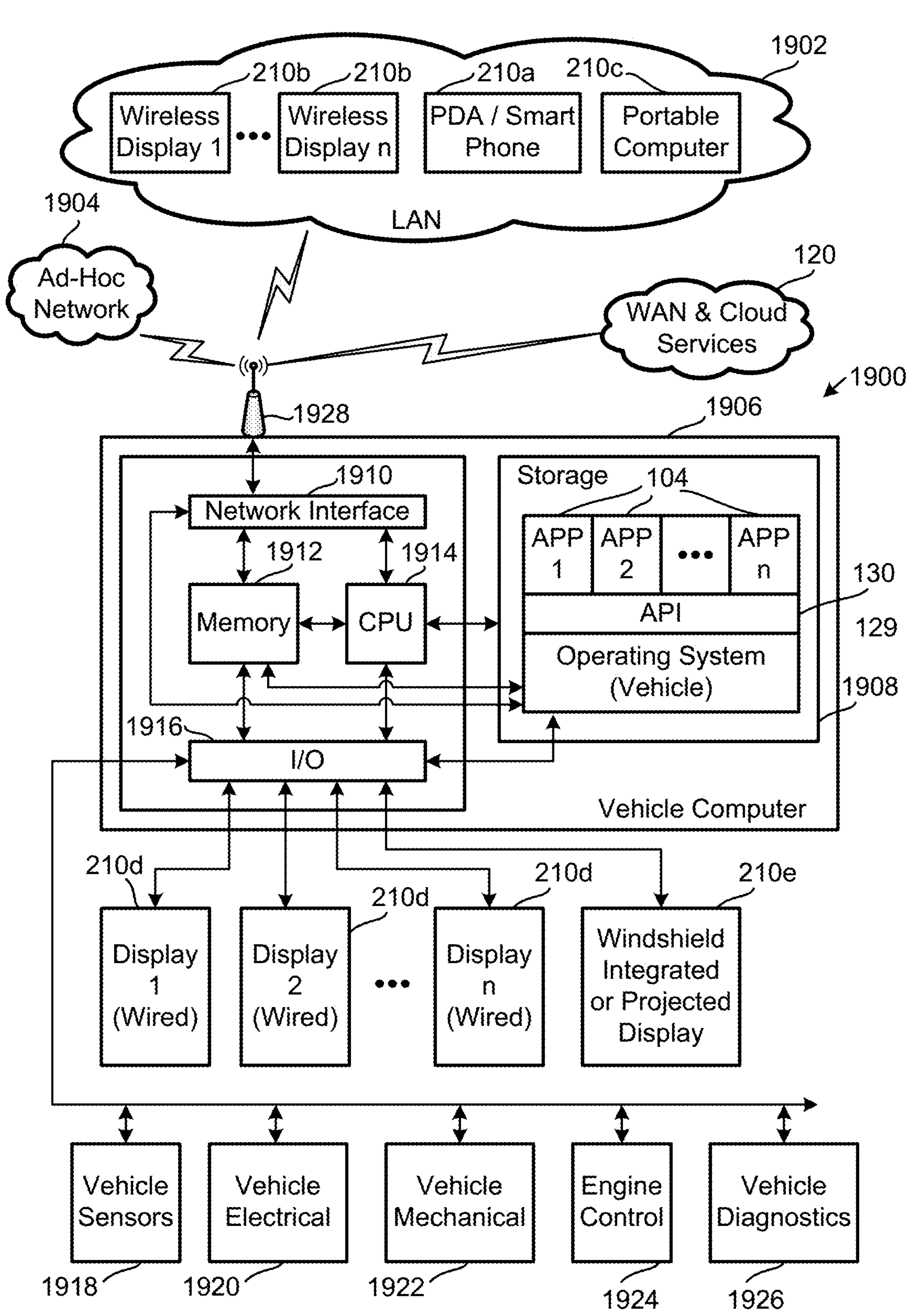
FIG. 19A describes how vehicle on-board computer with input output system useful for accepting input, processing input and displaying results in conjunction with stored computer readable programs or functions in the forms of APPs may be structured, in accordance with one embodiment.

FIG. 19A describes how vehicle on-board computer with input output system 1900 useful for accepting input, processing input and displaying results in conjunction with stored computer readable programs or functions in the forms of APPs 104 may be structured. Although system 1900 describes one way to provide vehicle on-board computing power to run APPs 104, the arrangement of the vehicle computer 1906 may be altered or arranged in differing fashions with differing connection routing in order to achieve the same. In this example, vehicle on-board computer 1906 may be comprised of components such as the network interface 1910, memory 1912, a central processing unit 1914, an input output buffer useful for streaming data 1916, storage 1908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 1906 has the ability to transmit, receive and process information using wired or wireless connections. One such wireless connection is provided by a wireless data sending and receiving antenna 1928 connected to a network interface 1910 useful for pairing with and communicating data with portable or stationary wireless devices which may or may not be part of a network 1902. Such wireless devices include but are not limited to wireless displays 210*b*, portable smart phones 210*a*, portable computers, 210*c* and even stationary objects, structures, buildings, toll bridges, other vehicles etc. The vehicle's network interface 1910 through antenna 1928 may also communicate with cloud services 120 to receive instructions from a remote location that invokes stored programs such as APPs 104 on the vehicle's computer. The vehicle may also send and receive data wirelessly in order to establish a connection with a peer-to-peer ad-hoc network. Invocations may result in output data streams interpreted by wireless devices 210*b*, 210*a*, 210*c* as well as wired devices such as wired displays 210*d* or vehicle integrated display devices such as windshield heads up projected display or integrated glass displays 210*e*. All data streams generated by APPs 104 stored on the vehicle's computer may also be triggered by wired devices such as vehicle sensors 1918, vehicle electrical systems 1920, vehicle electrical systems 1922, engine control systems 1924, vehicle diagnostics systems 1926, user input as well as environmental input.

A user and or vehicle may find system 1900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 1906 that can process the input using the computer's wireless antenna 1928, network interface 1910, input output system, 1916 automatically responding to the toll bridge with payment information. Once the payment is received and processed, the APP 104 receives information from the stationary wireless toll taking device which is then stored either locally on the vehicle's storage 1908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 19B describes one example of how stored data and function declarations may be compiled to provide intermediary access to a vehicle's computer controlling vehicle systems 1950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 1954 describes an example set of data that may reference memory locations and their contents. The contents of these memory locations may be modified by stored procedures 1956 or functions.

This HVAC API 130 has the ability to store data relating to the vehicle's temperature, status, target temperature, split zone temperate, data from electrical and mechanical sensors, calendar dates, error information among others. Invocable functions 1956 are the methods by which a third party APP 104 may manipulate data 1954 on-board a computer. Free access is not given to the restricted data on a vehicle's computer, thus a structured method or methods are described for user by third party APP developers. These functions 1956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 19C describes a set of computer readable and executable code 1970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees. The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 20:
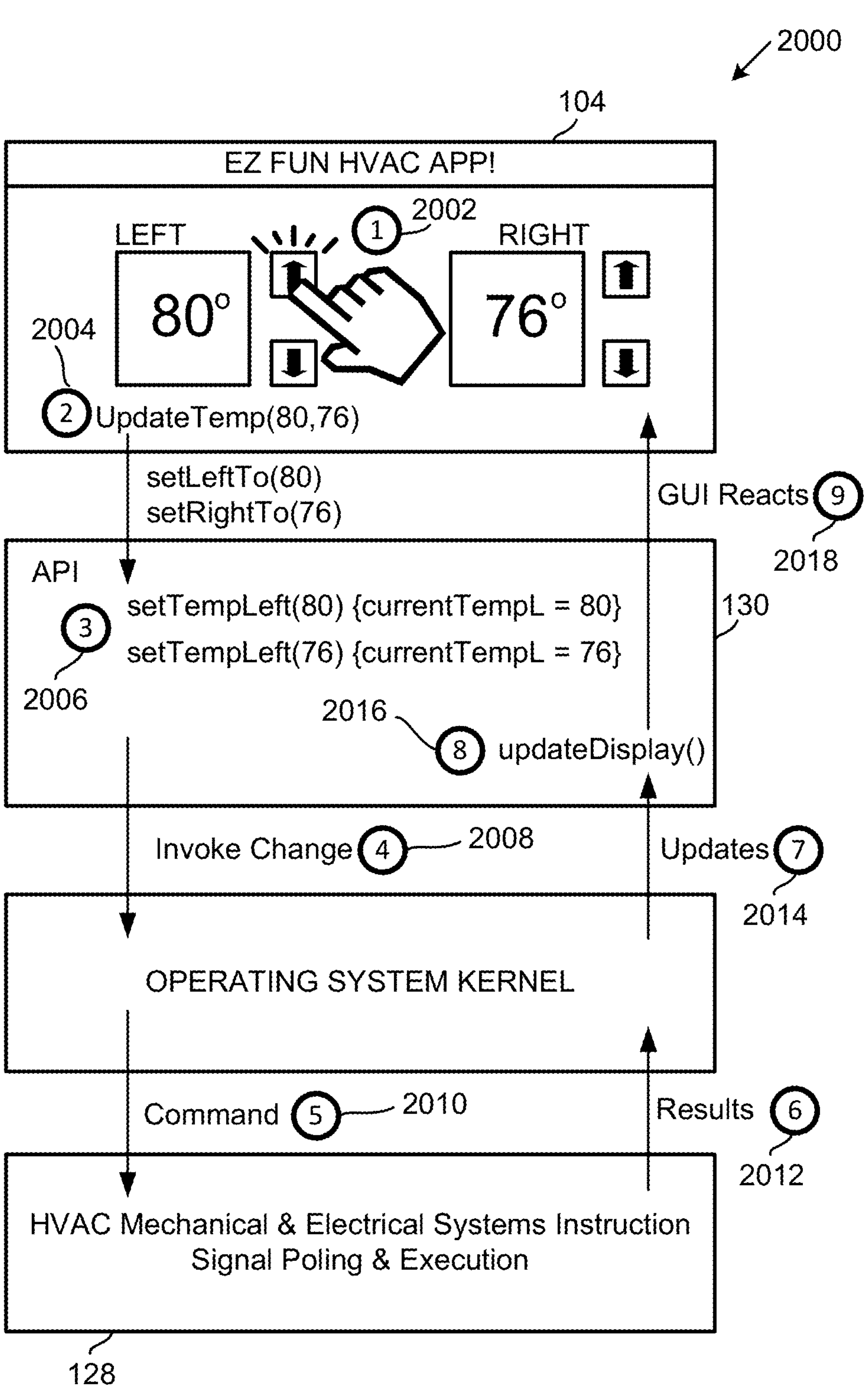
FIG. 20 describes the stepped flow of events as a user interacts with an APP, in this case, an HVAC APP, in accordance with one embodiment.

FIG. 20 describes the stepped flow of events 2000 as a user interacts with an APP 104, in this case, an HVAC APP 104. The GUI shown for APP 104 describes the first step 2002 where a user physically interacts with a sensor, screen, voice system etc. polling to see if an input has been received. The user's input in 2002 has been interpreted by the app to raise the temperature on the left hand side of the vehicle to 80 degrees and maintain the temperature on the right hand side of the vehicle at 76 degrees. This input invokes step 2004, which calls a stored function on the APP 104 that is API 130 allowable with arguments. The stored function may invoke other helper or associate functions within the API 130 in step 2006, which all in turn invokes restricted computer readable code at the operating system and or kernel level in step 2008. These invocations will then in turn command mechanical and or electrical systems in step 2005 in order to achieve the requested response in step 2002. The results of the commands on the vehicles systems are based back to the vehicle's operating system or kernel level in step 2012 which then updates data on the API 130 in step 2014 that the APP 104 is polling, such as updating the display to show the resulting temperature in step 2016. The results of a function that is invoked at the API 130 level updating the display produces a data stream translatable and displayable by the vehicle's screen showing the APP 104's GUI in 2018.

Figure 21:
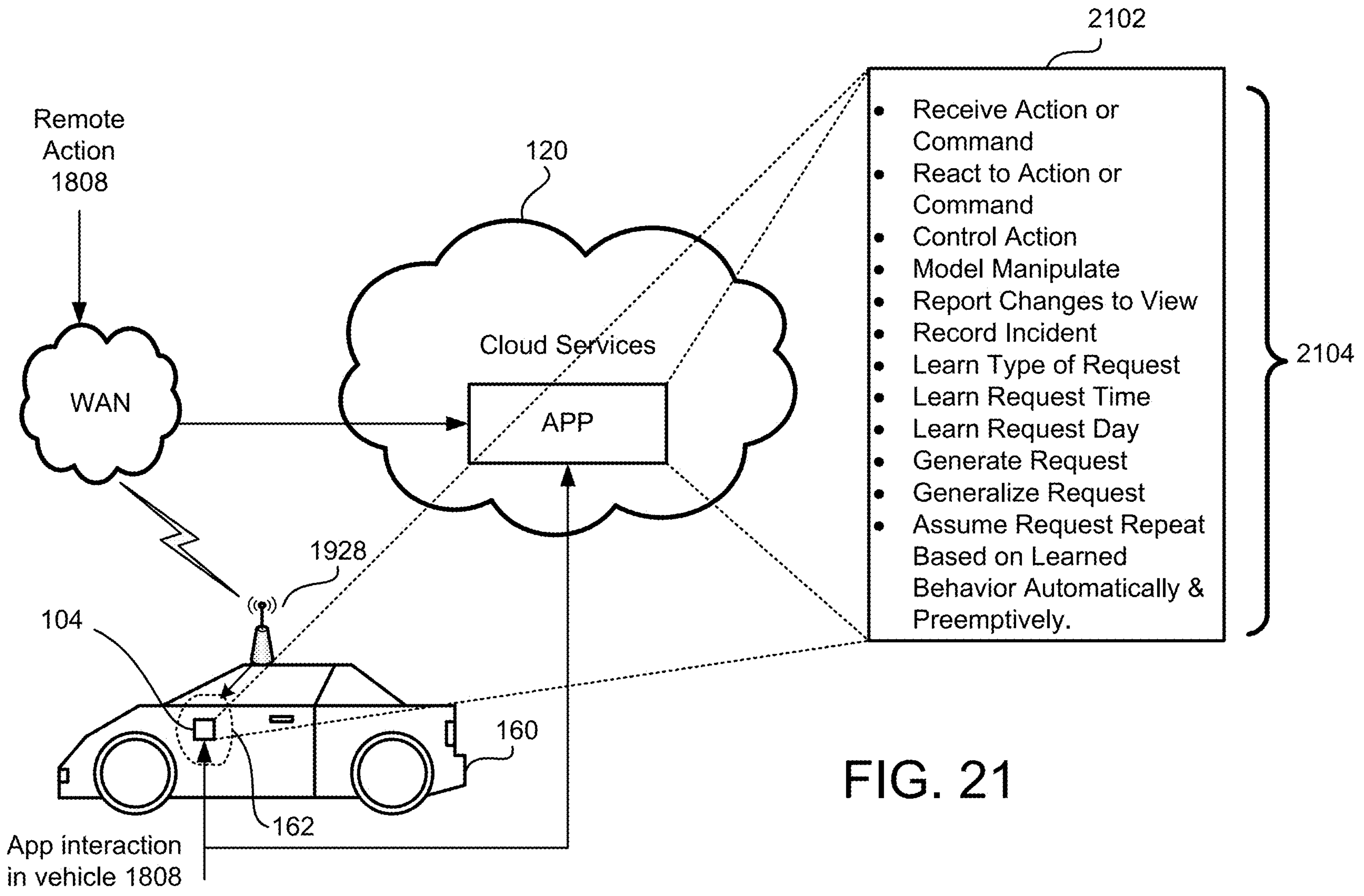
FIG. 21 Describes further ways an APP may take, process and produce results, in accordance with one embodiment.

FIG. 21 describes further example ways an APP 104 may take process and produce results 2100. FIG. 20 shows a way to interact with an APP 104 locally but a vehicle computer system may relay data, inputs and information to the APP while connected to a wide area network, local area network, cloud process 120 or private cloud. A remote action to invoke change on an APP 1808 may be initiated via a network and pass to the APP running on the vehicle 160 using the vehicle's antenna 1928 or wired interface. An APP 104 running virtually on a network or cloud services 120 may also take input remotely and process the results accordingly. Some of the inputs and results 2102 that an APP can take and produce locally or remotely include but are not limited to the set 2104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings. The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some cases, the settings can be manually adjusted by the user way from the auto settings. In such cases, the manual setting can be learned and can be provided more weighting since the user took the time to correct an auto setting. Thus, various levels of weighting or importance can be given to learn settings.

Figure 22A:
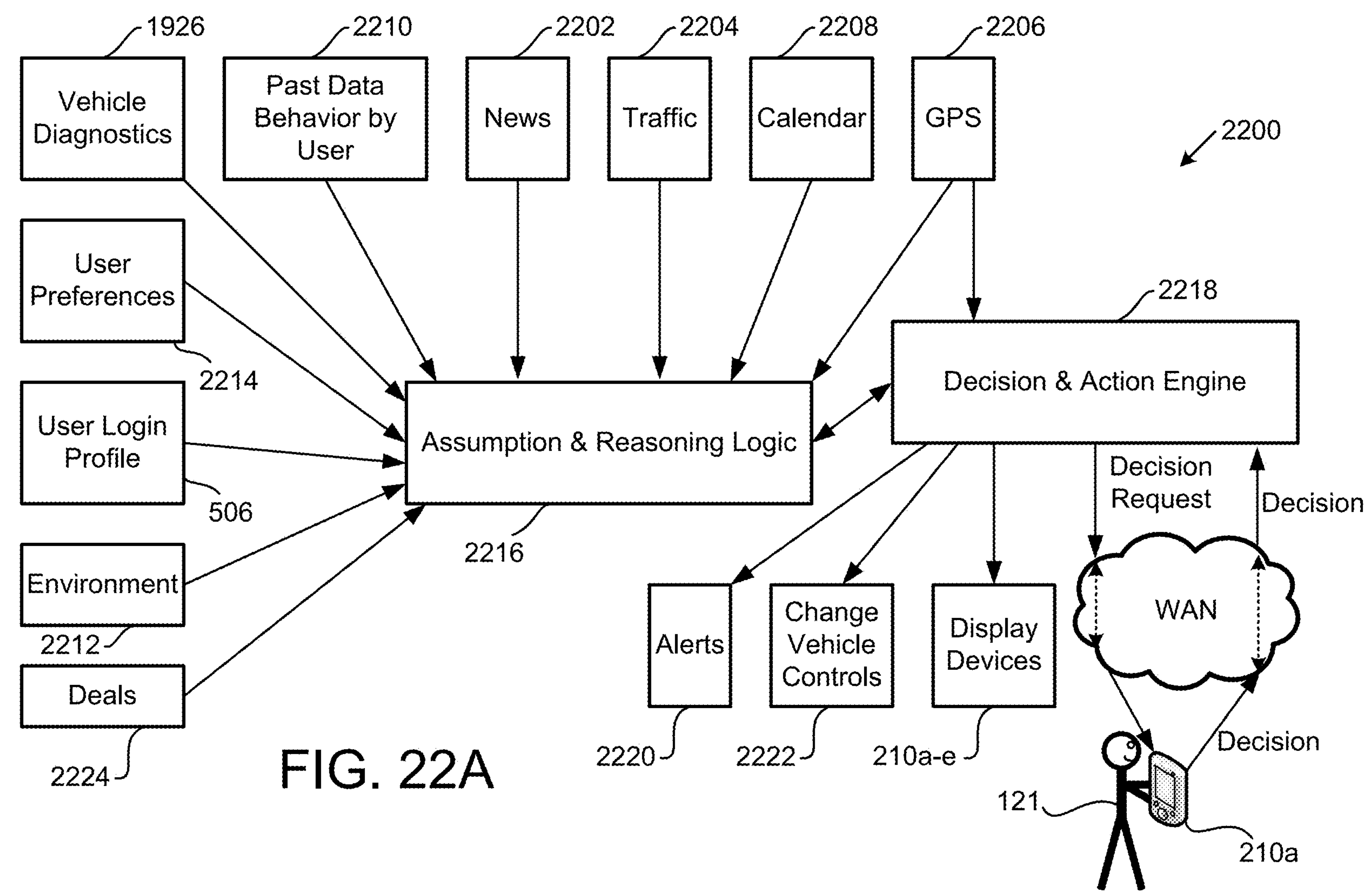
FIG. 22A describes an ecosystem where an APP in conjunction with a vehicle API may work together to make assumptions, make decisions and take actions, in accordance with one embodiment.

FIG. 22A describes an ecosystem where an APP 104 in conjunction with a vehicle API 130 may work together to make assumptions, make decisions and take actions 2200. API and APP code together can be arranged in such a fashion that creates an assumption and reasoning logic module 2216. This Assumption and reasoning logic module can take inputs from various systems and data streams including but not limited to GPS 2206, calendars 2208, traffic conditions 2204, local news 2202, past data of user behavior and interaction 2210, vehicle diagnostics 1926, user preferences 2214, user login profiles 506, environmental interpretations by sensors 2212, marketing deals 2224 among others. These inputs can be local and physical or remote and abstract via a network. The assumption and reasoning logic module 2216 compiles data from these sources to invoke decisions and actions on a decision and action engine 2218.

This decision and action engine 2218 has the ability to execute on what the assumption and reasoning logic module has determined needs to be done. The decision and action engine has the ability to produce alerts, both local, on screen, audibly, visually or remotely on a remote display device 210*a-e* using a data network. The decision and action engine 2218 also has the ability to change vehicle controls automatically on behalf of a user without user action based on assumptions made by the assumption and reasoning logic module 2216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides a decision remotely on their remote device 210*a*, the decision engine 2218 updates the assumption module 2216 so that it can augment its assumptions for an updated level of confidence on the next action trigger. These actions by the user automatically and continually update the assumption and reasoning logic module 2216 in order to fine tune the level of confidence on acting without user input and learn the user's behavior for future decisions.

FIG. 22B describes how one of many types of inputs into an assumption and reasoning logic module 2216 can be compiled over time. Although inputs can come from many sources, this particular example focuses on input into the assumption and reasoning logic module 2216 from past data originating and triggered by user behavior in order for module 2216 to learn. Past actions 2210 are logged into a database either locally on the vehicle computer or remotely which are fed into to module 2216. In this example, data about when the user's actions are stored, along with unique identifiers that will allow assumptions to be made in the future. These identifiers include times, dates, rates, capacities, temperatures, frequency, degrees, distance, etc. In this example, the system has been keeping track of when the user has been starting his or her engine in the morning on weekday sand weekends. The system harvests all data points associated with given events. These data points 2210 are purely mined data points and no assumptions or reasoning occurs at this point. This data will be used by the assumption and reasoning logic 2216 to determine future actions.

FIG. 22C describes one example of what an assumption and reasoning logic module 2216 may produce using the data points collected on an ongoing basis in FIG. 22B. Over time, using inputs that are continually harvested by a user's action, assumptions are made and refined to aid in making decisions for a user in advance or behalf. Module 2216 has taken the inputs provided by 2210 past data and behavior to determine that before a decision can be made, the user's local or network-stored calendar should be polled to determine how the user's schedule might impact the system's pending actions. For instance, if the system had determined that the user typically starts his vehicle at 8 am but the user's calendar shows a meeting at 730 am located at a location that does not match the current location, the vehicle may assume that the car should be started at 725. They system will determine its level of confidence of the decision and may poll the user for a decision.

The system, by using prior data points has stored assumptions based on conditions, the day it is, the temperature of the environment and historical events, that the user will most likely start the vehicle's engine between 803 am and 805 am, and if the temperature is in the 30s inside the vehicle, the user will most likely set the interior temperature to between 70 and 80 degrees, it is not likely that the user will use the are conditioning unit, if there is ice on the windshield, the user will most likely defrost the windshield for 7 minutes before departure, the user usually drives between 15 and 18 miles at this time of day, the user typically starts the vehicle again in the afternoon between 505 pm and 510 pm, if the temperature is in the mid-70s, the user usually activates the AC and sets the temperature to 65 degrees, typical weekend behavior, the user typically makes frequents stops, does not have a set time the vehicle is started, uses certain APPs at certain times and has a history of certain destinations as recorded by GPS.

FIG. 22D describes an example list of decision the decision and action engine 2218 may take based on information provided by the assumption and reasoning logic module 2216 and sets of assumptions created. The decision and action engine 2218 will attempt, using a degree of confidence to anticipate what the user will want to do in terms of engine start and stop, location destinations, preferences of temperature, driving habits and poll vehicle capacities to ensure the intended path the user usually takes is attainable. For example, the user usually drives a distance in the morning at a certain time, however, the vehicle's fuel supply will not allow for that distance to be traveled. Thus, the decision and action engine polls the user as a reminder that the user should begin their intended travel sooner than usual to allow for refueling time.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, vehicles can maintain information regarding where they are, where they are heading and their destination maintained which is maintained by GPS and navigation systems on-board. The information collected and maintained by every vehicle may be mutually exclusive, meaning that only each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another. This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

In one embodiment, a method for customizing a user interface is provided. The method includes receiving a request to customize a user interface of a vehicle and providing selection options to identify a vehicle type among a plurality of vehicle types. Each vehicle type is associated with system components native to the vehicle type and one or more of the control interfaces that can be mapped to an application programming interface (API). The method includes identifying a plurality of applications available for the vehicle type, where each of the applications has a link to at least one of the control interfaces via the API of the system components. The method includes receiving selection of the vehicle type at cloud services, which interfaces with a website over the Internet or a backend of a website over the Internet. The method includes receiving selection of an application selected from the plurality of applications; the selection of the application is made so as to add an app interface for the application to the user interface of the vehicle. The method, at cloud services, generates a custom configuration of the user interface for the vehicle type that includes system interfaces for some of the system components native to the vehicle type and the app interface for the application. The custom configuration is saved to a user account, at a database in cloud storage associated with cloud services. In one embodiment, code for the custom configuration is transferred to a vehicle that is to be associated with the user account. The code of the custom configuration is defined to set a display of the vehicle to provide the user interface having the system interfaces along with the app interface, the method is executed by one or more processors.

In some embodiments, the method includes receiving a request to modify the custom configuration; enabling changes to the selection of the application, the changes including adding additional applications or removing the application; regenerating the custom configuration with the changes; saving the custom configuration to the user account, and transferring the custom configuration having the changes to the vehicle.

In some embodiments, the method includes enabling identification of a second vehicle for the user account, the second vehicle having a second vehicle type.

In some embodiments, the method includes processing a request to transfer the custom configuration to the second vehicle. The processing of the request includes, automatically updating the system components for the second vehicle type, the system components of the second vehicle including more or less features based on the second vehicle type as defined by a manufacturer of the second vehicle; and determining if the application functions for the second vehicle type, and providing options to select an update for the application in response to processing the request to transfer the custom configuration when the application does not fully function for the second vehicle type.

In some embodiments, the manufacturer of the vehicle and the second vehicle is either the same or different.

In some embodiments, the method includes processing a request to use the custom configuration on a second vehicle. The processing of the request includes, receiving login credentials for the user account to enable the use of the custom configuration from the second vehicle, automatically updating the system components for the second vehicle type, the system components of the second vehicle including more or less features based on the second vehicle type as defined by a manufacturer of the second vehicle; and determining if the application functions for the second vehicle type, and if the application does not function for the second vehicle type, either omitting the application from the custom configuration or providing a replacement application for the application.

In some embodiments, the method includes maintaining a database of user accounts, each user account having one or more custom configurations of the user interface; processing a request to use a second custom configuration on the vehicle, the request being received from the vehicle upon entering credentials to access a second user account; transferring the second custom configuration to the vehicle for use while the credentials of the second user account are active on the vehicle, wherein the request to use the second custom configuration terminates use of the custom configuration in favor of the second custom configuration.

In some embodiments, the method includes terminating a session of use of the custom configuration on the vehicle, termination of the session acts to, reset the display of the vehicle to provide the user interface with system interfaces that are default set by the manufacturer of the vehicle; or set a second custom configuration for a second user account.

In some embodiments, the display of the vehicle includes any one or more of a main dashboard display, or a center console display, or a headrest display, or a movable display, or a wireless display, or a wire-connected display.

In some embodiments, the method includes receiving a request to make changes to add or remove applications from the custom configuration.

In some embodiments, the method includes enabling a user interface tool to arrange some of the system components and app components of the application on a display; the arranging includes defining positional locations for graphical user interface (GUI) items of the custom configuration.

In some embodiments, the method includes enabling linking of one or more applications executed on a mobile device to be presented on the display of the vehicle in accordance with the custom configuration, the linking enabled upon pairing the mobile device with electronics of the vehicle.

In some embodiments, the method includes receiving user input via the custom configuration; learning patterns of user input over time; automatically programming one or more components of the custom configuration based on the learned patterns of user input.

In some embodiments, the method includes automatically adjusting positional locations for graphical user interface (GUI) items of the custom configuration based on the learned patterns; and saving the adjustments to the user account, the user account being saved in a database that is interfaced over the Internet with cloud services that execute code using one or more processors.

In some embodiments, the one programming of one or more components of the custom configuration includes automatically setting input based on times of day or days of week, or dates of month, or combinations thereof.

In some embodiments, the custom configuration of the vehicle is transferrable to a second vehicle.

In some embodiments, the custom configuration is saved to the user account in cloud storage, and cloud processing provides communication with the vehicle over the Internet.

In some embodiments, the cloud processing provides a website interface to enable selection of the vehicle type and the application to define the custom configuration and also enables updates to the custom configuration to add, delete or update applications to be associated with the custom configuration.

In some embodiments, the code for the custom configuration is transferred to the vehicle upon receiving credentials to access the user account from the vehicle so as to associate the vehicle to the custom configuration, the association of the custom configuration to the vehicle being for a period of time.

In some embodiments, the period of time is for a session that remains until logged out of the user account, or a second user account logs in to define a new session with a second custom configuration of the second user account.

In some embodiments, the vehicle electronics are programmed with a master account, the master account being in communication with cloud services over the Internet, the master account enabling use of the custom configuration with one or more restrictions.

In some embodiments, the restrictions include enabling, disabling or regulating system components of the vehicle, enabling or disabling certain applications of the custom configuration, wherein the restrictions being updateable over a website that enables remote configuration and monitoring of the vehicle using cloud services over the Internet for the master account, the master account enabling one or more user accounts to be used on the vehicle, such that one or more custom configurations are usable on the vehicle during respective sessions.

In some embodiments, the predefined code is application programming interface (API) for communicating with at least one control interface of the system component.

In one embodiment a computer implemented method is provided. The method provides providing access to cloud services over the Internet for customizing a user interface of a vehicle; providing selection options to identify a vehicle type among a plurality of vehicle types, each vehicle type being associated with system components native to the vehicle type; identifying a plurality of applications available for the vehicle type, each of the applications provided with code for linking to at least one control interface of the system components; receiving selection of an application selected from the plurality of applications, the selection of the application being made so as to add an app interface for the application to the user interface of the vehicle; generating a custom configuration of the user interface for the vehicle type that includes system interfaces for some of the system components native to the vehicle type and the app interface for the application; saving the custom configuration to a user account in a database interfaced with the cloud services; and transferring the custom configuration to electronics of a vehicle from database, the custom configuration being defined to set a display of the vehicle to provide the user interface having the system interfaces along with the app interface, the method being executed by a processor.

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

The invention claimed is:

1. A vehicle having a display screen for rendering information regarding functionality of the vehicle and mobile device applications; comprising:

an on-board computer integrated with vehicle, the on-board computer is configured to execute program instructions for monitoring status of the vehicle, displaying status of the vehicle on the display screen, and receiving input for controlling said functionality;

communications circuitry of the vehicle being interfaced with the on-board computer to provide a connection to the Internet for the vehicle, wherein the on-board computer is configured to execute program instructions for communicating over the Internet with a server of a manufacturer of the vehicle using the communications circuitry, wherein the server is configured to use a user profile to access settings for a user of the vehicle and collect said status of the vehicle; and local communications circuitry of the vehicle being interfaced with the on-board computer, the local communications circuit is configured to communicate with a mobile device to enable the mobile device to pair with the on-board computer, wherein said on-board computer processes program instructions to control use of credentials of the user associated to said user profile to process said pairing of the mobile device to the on-board computer of the vehicle;

wherein at least some data accessed from one or more of the mobile device applications installed on the mobile device is used to render content to the display screen of the vehicle;

wherein said content rendered on the display screen of the vehicle is in addition to content from a native application of the vehicle rendered on the display screen.

2. The vehicle of claim 1, wherein the content from said native application of the vehicle is displayed on one or more regions on the display screen of the vehicle along with said content of at least one of said mobile device applications.

3. The vehicle of claim 2, wherein at least one of said mobile device applications and the native application is displayed on the display screen using an app icon that is selectable via the display screen or via a voice input command to access respective content from the mobile device applications and/or the native application of the vehicle.

4. The vehicle of claim 3, wherein said app icon of each of the mobile device applications and the native application is arranged on the display screen in accordance with a custom setting that is saved to the user profile.

5. The vehicle of claim 4, wherein the custom setting is accessed from a user account having said user profile associated therewith.

6. The vehicle of claim 1, wherein an app icon for each of the mobile device applications and the native application is arranged on the display screen in accordance with a custom setting, and said custom setting is applied when a user account or user profile is used is association with the vehicle.

7. The vehicle of claim 6, wherein the user account is usable in one or more other vehicles, and when used in another vehicle, said custom setting is automatically applied and correlated to a display screen of said another vehicle.

8. The vehicle of claim 1, wherein the mobile device is configured to use a first Internet connection provided via an Internet provider associated with the mobile device or via a second Internet connection provided via an Internet provider associated with the vehicle.

9. The vehicle of claim 1, wherein the local communications circuitry enables communication using one of a WIFI protocol, a Bluetooth protocol, a near field communication (NFC) protocol, a short range communications protocol, or a radio frequency communications protocol.

10. The vehicle of claim 1, wherein the credentials include information associated with a biometric identifier of the user.

11. The vehicle of claim 10, wherein the biometric identifier is one of a voice sound, or a facial feature, or an eye-retina scan feature, or fingerprint scan feature.

12. The vehicle of claim 1, wherein the display screen of the vehicle includes one or more of a main dashboard display, or a center console display, or a combined main dashboard and center console display, or a glass surface display, or a windshield display, or a window display, or a touch surface display, or a headrest display, or a movable display, or a wireless display, or a wire-connected display.

13. The vehicle of claim 1, wherein the server is configured to store information associated with the user profile and applying learning of settings and use of the vehicle to suggest or make a new setting to be applied to the vehicle.

14. The vehicle of claim 13, wherein the new setting is sent to the vehicle from the server for application on the vehicle using the on-board computer.

15. The vehicle of claim 1, wherein select ones of said mobile device applications are pre-identified as safe by data read by the on-board computer or the server, or being identified as allowed by settings in a user account associated with the user profile.

16. The vehicle of claim 15, wherein pre-identified as safe includes an application that does not enable interaction that may cause distraction of a driver of the vehicle while the vehicle is being operated.

17. The vehicle of claim 1, wherein the server is part of a cloud data center that includes a plurality of servers, storage and logic for making Internet connections to vehicles and collecting status from vehicles and storing said user profile among other user profiles of the other users having vehicles with access to said cloud data center that is associated with the manufacturer of the vehicle.

18. The vehicle of claim 1, wherein said vehicle includes system components, and at least one system component is provided with application-programming interface (API), wherein said API provides at least one mobile device application with access to control said system component.

19. The vehicle of claim 18, wherein the system component is part of a native function of the vehicle, and said at least one mobile device is a third-party application that is enabled to control said system component via the API of the system component.

20. The vehicle of claim 1, wherein at least one of said mobile device applications is configured to use a structured programming language to execute stored functions allowed via an application-programming interface (API) of the vehicle to control a native function of the vehicle, wherein said mobile device application is a non-vehicle native application.

* * * * *